(12) United States Patent
Tamboli et al.

(10) Patent No.: US 6,792,431 B2
(45) Date of Patent: Sep. 14, 2004

(54) METHOD, SYSTEM, AND PRODUCT FOR DATA INTEGRATION THROUGH A DYNAMIC COMMON MODEL

(75) Inventors: Aderbad Tamboli, Sugarland, TX (US); John Jacobs, Houston, TX (US)

(73) Assignee: Anadarko Petroleum Corporation, The Woodlands, TX (US)

( * ) Notice: Subject to any disclaimer, the term of this patent is extended or adjusted under 35 U.S.C. 154(b) by 531 days.

(21) Appl. No.: 09/850,317

(22) Filed: May 7, 2001

(65) Prior Publication Data

US 2003/0014617 A1 Jan. 16, 2003

(51) Int. Cl.[7] ........................... G06F 17/00; G06F 7/00
(52) U.S. Cl. ........................................ 707/102
(58) Field of Search ................................ 707/100, 102

(56) References Cited

U.S. PATENT DOCUMENTS

| | | |
|---|---|---|
| 4,751,740 A | 6/1988 | Wright |
| 5,119,465 A | 6/1992 | Jack |
| 5,206,951 A | 4/1993 | Khoyi |
| 5,210,824 A | 5/1993 | Putz |
| 5,339,434 A | 8/1994 | Rusis |
| 5,410,675 A | 4/1995 | Shreve |
| 5,428,737 A | 6/1995 | Li |
| 5,446,880 A | 8/1995 | Balgeman |
| 5,524,253 A | 6/1996 | Pham |
| 5,557,790 A | 9/1996 | Bingham |
| 5,574,904 A | 11/1996 | Yunoki |
| 5,634,124 A | 5/1997 | Khoyi |
| 5,701,423 A | 12/1997 | Crozier |
| 5,706,434 A | 1/1998 | Gremen |
| 5,708,828 A | 1/1998 | Coleman |
| 5,715,397 A | 2/1998 | Ogawa |
| 5,781,902 A | 7/1998 | Waszkiewicz |
| 5,781,911 A | 7/1998 | Young |
| 5,794,039 A | 8/1998 | Guck |
| 5,794,234 A | 8/1998 | Church |
| 5,842,213 A | 11/1998 | Odom |
| 5,848,415 A | 12/1998 | Guck |
| 5,870,746 A | 2/1999 | Knutson |
| 5,873,049 A | 2/1999 | Bielak |
| 5,884,310 A | 3/1999 | Brichta |
| 5,911,776 A | 6/1999 | Guck |
| 5,926,810 A * | 7/1999 | Noble et al. ............... 707/4 |
| 5,933,837 A | 8/1999 | Kung |

(List continued on next page.)

OTHER PUBLICATIONS

Petris Technology, Inc., A ROSE design model describing certain implementation details for one or more embodiments of the invention, Nov. 13, 2000–create date on document file properties, WE–RE–201.mdl.

(List continued on next page.)

*Primary Examiner*—Greta Robinson
*Assistant Examiner*—Susan Rayyan
(74) *Attorney, Agent, or Firm*—Raymond R. Ferrera; Arnold & Ferrera

(57) ABSTRACT

Data integration including extracting a first native record having a first native format from a first native repository through a first adapter, the first adapter loosely coupled for data integration to a data integration application, the first native format having a datatype; transforming the first native record having first native format to a first native record having dynamic common format, the dynamic common format being a subset of a dynamic common model, the dynamic common model comprising mappings to and from the dynamic common format for all native records in all datatypes; transforming the format of the first native record having dynamic common format to a first native record having second native format; and inserting through a second adapter, also loosely coupled to the application, the first native record the second native format into a second native repository.

7 Claims, 33 Drawing Sheets

U.S. PATENT DOCUMENTS

| | | | |
|---|---|---|---|
| 5,937,409 A | | 8/1999 | Wetherbee |
| 5,970,490 A | | 10/1999 | Morgenstern ................ 707/10 |
| 6,038,565 A | | 3/2000 | Nock |
| 6,061,688 A | | 5/2000 | Kilpatrick |
| 6,092,099 A | | 7/2000 | Irie |
| 6,098,128 A | | 8/2000 | Velez-McCaskey |
| 6,101,556 A | | 8/2000 | Piskiel |
| 6,141,663 A | | 10/2000 | Hunkins |
| 6,148,307 A | | 11/2000 | Burdick |
| 6,151,608 A | | 11/2000 | Abrams |
| 6,167,405 A | | 12/2000 | Rosensteel, Jr. et al. .... 707/102 |
| 6,222,533 B1 | * | 4/2001 | Notani et al. ................ 345/733 |
| 6,301,584 B1 | | 10/2001 | Ranger ....................... 707/103 |
| 6,339,775 B1 | | 1/2002 | Zamanian et al. .......... 707/101 |
| 6,366,921 B1 | | 4/2002 | Hansen et al. .............. 707/103 |
| 6,615,220 B1 | * | 9/2003 | Austin et al. ............ 707/104.1 |
| 6,636,861 B1 | * | 10/2003 | Stack ......................... 707/101 |

OTHER PUBLICATIONS

Petris Technology, Inc., User manual for the WINDS software product that implements certain embodiments of the invention, Nov. 9, 2000–create date on document file properties, WE–2 User Guide 11–9–00.doc.

Petris Technology, Inc., A Microsoft PowerPoint presentation regarding the WINDS software product that implements certain embodiments of the invention, Mar. 29, 2000–create date on document file properties, AAPG$_{13}$ WE_presentational1.ppt.

Petris Technology, Inc., A WINDS design document comprising a requirements analysis and a use case model., Dec. 15, 1998–create date on document file properties, ucm winds.doc.

Petris Technology, Inc., A WINDS technical specification comprising a guide for development of adapters, Jul. 26, 2000–create date on document file properties, Draft—Adapter Development Guide (Rev 4).doc.

Petris Technology, Inc., Eight JPEG graphical images comprising screen images from WINDS, Jun. 26, 2000–create date on document file properties, advanced_attributes2.jpg, preferences.jpg, home.jpg,login.jpg,search.jpg, Advanced_attributes.jpg, advanced.jpg,search_location.jpg.

Petris Technolody, Inc., HTML pages comprising an on–line tutorial for WINDS, Ded. 9, 1999, WIndsHelp.zip.

Petris Technology, Inc., A report from a ROSE model comprising a component view report in Unified Modeling Language Syntax or UML, May 20, 1999–internal document date, WINDS Components.doc.

Petris Technology, Inc., A PowerPoint document comprising diagrams of WINDS, Apr. 30, 1999–create date in document file properties, Components2.ppt.

Petris Technology, Inc., A features development status report for WINDS, Mar. 31, 1999–internal document date and file system date, Features.doc.

Petris Technology, Inc., A promotional–style PowerPoint description of WINDS, entitled "DEMO Story Board.", Mar. 16, 1999–create date in document file properties, DEMO Storyboard—Working.ppt.

Petris Technology, Inc., A promotional–style summary of WINDS features from early 1999, Mar. 23, 1999–file print date in document file properties, WindsPaperFINAL.doc.

Petris Technology, Inc., A promotional–style summary of WINDS features in a PowerPoint file, Dec. 22, 1998–create date in document file properties, arch.ppt.

Petris Technology, Inc., User Interface functionality of the data search & browsing components for ADDIE in late 1998, Nov. 23, 1998–print date in document file properties, ADDIE UI Functionality.doc.

Petris Technology, Inc., Key functional features and other product requirements for the ADDIE system in late 1998, Nov. 25, 1998–create date in document file properties, ADDIE Market–Product Requirements V3.doc.

Petris Technology, Inc., A status summary report for the WINDS project as of May 1999, entitled "BSI Disappointments.", May 26, 1999–internal document date, BSI Disappointments.doc.

Petris Technology, Inc., A PowerPoint file comprising an executive presentation on the WINDS project status in May 1999, May 27, 1999–internal document date, WINDS Enterprise Executive Steering Committee.doc.

Petris Technology, Inc., ROSE model of the WINDS project as it existed in early 1999, Jan. 25, 1999–modify date on document file properties, PetrisWINDS.mdl.

Petris Technology, Inc., Petris WINDS Early Adopter Program, Dec. 1998, Hard copy only.

Petris Technology, Inc., Press Release regarding Houston Advanced Research Center, Oct. 1999, Hard copy only.

Petris Technology, Inc., Press Release the Anadarko/Petris joint development effort, Mar. 30, 1999, Hard copy only.

Petris Technology, Inc., WINDS/ADDIE Marketing and Sales Plan, 1999, Hard copy only.

Petris Technology, Inc., PowerPoint presentation comprising a WINDS marketing and sales review, Feb. 14, 2000–internal document date, Hard copy only.

Anadarko Petroleum Corporation, A spreadsheet showing relationships between vendor applications or native repositories and datatypes, Mar. 1, 1999–from document file properties, App VS Data.xls.

Anadarko Petroleum Corporation, An attribute list for an early version of WINDS, May 18, 1999–from document itself, Common Model_ATTRIBUTE_DESC1.doc.

Anadarko Petroleum Corporation, An early design document for a 'Data Exchange Environment,' part of the early WINDS project, which was known in 1998 as "EDDIE.", Nov. 6, 1998–print date from document file properties, Data Exchange Design Guidelines.doc.

Anadarko Petroleum Corporation, A description of a 'Data Exchange Model' representing flow of requests and data among components in a data exchange environment, part of the early WINDS project, which was known in 1997 as "EDDIE.", Feb. 19, 1997–print date from document file properties, Data Exchange Environment.doc.

Anadarko Petroleum Corporation, This document lists the services required by a 'Data Exchange Environment' during data exchange transactions, Feb. 19, 1997–believed to have same date as previous document, Data Exchange Servies. doc.

Anadarko Petroleum Corporation, Design meeting notes from John Jacobs, Nov. 5, 1998–creation date in document file properties, Data Types.doc.

Anadarko Petroleum Corporation, Spreadsheet showing early listing of data elements for conversion among databases identified by vendor, Jul. 7, 1998–print date from document file, Datamap.xls.

Anadarko Petroleum Corporation, A design document comprising a requirements specification, Oct. 14, 1996 create date on file properties, Design Binder.obd.

Anadarko Petroleum Corporation, A design document for an Anadarko–Recall Transfer Utility, 'Recall' being a vendor of native repository systems, the document purporting to specify 'Features.', Dec. 2, 1996–create date on file properties, Design Binder.obd.

Anadarko Petroleum Corporation, A design document comprising an initial use–case analysis, entitled 'User Scenarios for the Database Project.', Nov. 11, 1996–create date on file properties, Design Binder.obd.

Anadarko Petroleum Corporation, A design document comprising a Microsoft PowerPoint diagram intended to show user workflow and data flow for the WINDS (EDDIE) project, Jun. 6, 1996–create date on file properties, Design Binder.obd.

Anadarko Petroleum Corporation, A full system design prepared by Berger & Co., Information Management Consultants. Apparently the 'Petroleum Management System,' socalled in the document refers to the early WINDS project, Feb. 28, 1997–document internal date and print date in document file properties, DETDESMO.doc.

Anadarko Petroleum Corporation, Design document describing process flow for data transfers for Recall™ stores and for vendor–neutral stores, entitled "MetaDatabase Transfer Process.", Jan. 9, 1997–print date from document file properties, MetaDataBaseTransferprocess.doc.

Anadarko Petroleum Corporation, A design specification for data objects as containing data retrieved from a source via a 'Source Exchange Link.' Not dated apparently from early 1997, Object Requirements.doc.

Anadarko Petroleum Corporation, A comparative attribute listing among RECALL™, Open Works™, and Iris™ vendor database systems, Mar. 30, 1998 created date in document file properties, OW VN RC Mapping Chart.xls.

Anadarko Petroleum Corporation, A listing of geophysical attributes for well headers, well logs, and log curves for an OpenWorks native repository, May 5, 1998–create date in document file properties, ow trans.xls.

Anadarko Petroleum Corporation, Early EDDIE design document describing and relating requirements and features, entitled "Preliminary Design Document.", Dec. 3, 1996–crate date in document file properties, Preliminary Design Document.doc.

Anadarko Petroleum Corporation, A listing of oil field and well header attributes for RECALL™ and OpenWorks™ native repositories, Apr. 20, 1998–create date in document file, R2otbls.xls.

* cited by examiner

*Example Native Record Format For A Well*

```
wellID      wellid;                    ⎫ /* key */
char        uwi [27];                  ⎪ /* alternate key */
char        well_uwi_type [11];        ⎬ 1202
char        common_well_name [81];     ⎪
char        well_operator [41];        ⎪
char        well_name [41];            ⎭
char        well_number [11];          ⎫
double      x_coordinate;              ⎪
double      y_coordinate;              ⎪
double      latitude;                  ⎪
double      longitude;                 ⎪
double      x_coord_bh;                ⎬ 1204
double      y_coord_bh;                ⎪
double      latitude_bh;               ⎪
double      longitude_bh;              ⎪
char        elev_type [3];             ⎪
float       elevation;                 ⎪
float       total_depth;               ⎭
float       plugged_back_td;           ⎫
char        field [41];                ⎪
char        basin [61];                ⎬ 1206
char        country [COUNTY_LEN];      ⎪
char        state [STATE_LEN];         ⎪
char        country [COUNTRY_LEN];     ⎭
char        initial_class [41];        ⎫
char        initial _status [41];      ⎪
char        current_class [41];        ⎬ 1208
char        current_status [41];       ⎪
gdiDate_t   current_status_date;       ⎭
int         symbol;
char        data_source [6];
char        platform_id [21];
char        platform_slot_no [13];
```

FIG. 12A

*Example Native Record Format For A Well, Continued*

```
char       on_off_shore [4];              ⟵ 1210
char       plot_name [21];           ⎫
char       survey_loc_type [13];     ⎟
char       govern_area [16];         ⎟
int        lease_id;                 ⎟
char       permit_no [11];           ⎬ 1212
gdiDate_t  permit_dte;               ⎟
gidDate_t  completion_date;          ⎟
char       authorization_no [21]     ⎟
float      internal_drilling_cost;   ⎟
float      total_drilling_cost;      ⎟
char       borehole_type [11];       ⎭
char       farm_out [2];
char       security_on_off_flg [4];
char       data_acq_company [41];
char       data_acquisition_type [13];
double     orig_x_lon;
double     orig_y_lat;
double     orig_bh_x_lon;
double     orig_bh_y_lat;
int        orig_crs_id;
int        orig_bh_crs_id;
char       currency [25];
char       remark [81];
char       total_depth_ouom [13];
char       plugged_back_td_ouom [13];
char       elevation_ouom [13];

gdiDate_t  create_date;
char       create_user_id [33];
gdiDate_t  update_date;
char       update_user_id [33];
```

FIG. 12B

*Example Native XML For A Well*

```
<Well>
<project>OWDEMO</project>
<wellid>42</wellid>
<uwi>1029988</uwi>
<well_operator>PENNZOIL</well_operator>
<well_name>OAKLAND CORP 2</well_name>
<x_coordinate>0.000000</x_coordinate>
<y_coordinate>0.000000</y_coordinate>
<latitude>32.923191</latitude>
<longitude>-94.222778</longitude>
<x_coord_bh>0.000000</x_coord_bh>
<y_coord_bh>0.000000</y_coord_bh>
<latitude_bh>0.000000</latitude_bh>
<longitude_bh>0.000000</longitude_bh>
<elev_type>UN</elev_type>
<elevation>0.000000</elevation>
<total_depth>10970.000000</total_depth>
<plugged_back_td>0.000000</plugged_back_td>
<field>UNKONWN</field>
<basin>UNKNOWN</basin>
<country>CASS</county>
<state>TEXAS</state>
<country>United States</country>
<initial_class>UNKNOWN</initial_class>
<initial_status>UNKNOWN</initial_status>
<current_class>UNKNOWN</current_class>
<current_status>UNKNOWN</current_status>
<symbol>0</symbol>
<internal_drilling_cost>0.000000</internal_drilling_cost>
<total drilling_cost>0.000000</total_drilling_cost>
<data_acq_company>UNKNOWN</data_acq_company>
<data_acquisition_type>UNKNOWN<data_acquisition_type>
<currency>UNKNOWN</currency>
<total_depth_ouom>feet</total_depth_ouom>
<plugged_back_td_ouom>feet</plugged_back_td_ouom>
<elevation_ouom>feet</elevation_ouom>
<create_date>1999-11-03 14:43:55</create_date>
<create_user_id>AXT001</create_user_id>
<update_date>1999-11-03 14:43:56</update_date>
<update_user_id>AXT001</update_user_id>
<proxy>
        <project>OWDEMO</project>
        <wellid>42</wellid>
</proxy>
<well>
```

FIG. 13

Example Native Record Format For A Well Log Curve

```
well ID       wellid;                        /*key*/
char          log_crv_name[26];              /*key*/
long          log_run_no;                    /*key*/
int           log_crv_version;               /*key*/
int           log_curve_id;
int           creating_anal_id;
long          logging_job_no;
char          tool_code[13];
long          tool_position_seq_no;
char          log_pass_id[5];
char          log_name[31];
char          data_source[6];
char          original_data_source[6];
int           storage_id;
char          trace_storage_type[13];
char          section[61];
char          block[61];
char          sub_block[61];
char          external_crv_name[26];
char          external_well_name[81];
char          log_trace_handle[61];
int           total_samples;
int           depth_units;
int           depth_mode;
char          log_crv_unit_meas[31];
int           unit_type_id;
char          access_mode[2];
float         top_depth;
float         base_depth;
double        crv_increm;
float         min_value;
float         max_value;
float         znon;
int           samples_per_point;
long          second_dimension_unit_id;
char          second_dimension_desc[41];
```

*FIG. 14A*

Example Native Record Format For A Well Log Curve, Cont'd

```
int         log_quality;
char        api_code[13];
long        log_curve_vid;
char        remark[81];
int         remarks_ind;
char        value_working_uom[13];
char        value_storage_uom[13];
char        log_crv_alias[26];
float       *depths;
float       *values;

gdiDate_t   create_date;
char        create_user_id[33];
char        creation_routine[11];
gdiDate_t   update_date;
char        update_user_id[33];
char        update_routine[11];
```

*FIG. 14B*

Example Native XML For A Well Log Curve

```
<logcurve>
    <wellid>167</wellid>
    <log_crv_name>SP</log_crv_name>
    <log_run_no>1</log_run_no>
    <log_crv_version>1</log_crv_version>
    <log_curve_id>418</log_curve_id>
    <tool_code>.</tool_code>
    <log_name>COMPOSITE</log_name>
    <data_source>QC</data_source>
    <trace_storage_type>INTERNAL</trace_storage_type>
    <total_samples>29109<total_samples>
    <depth_units>2</depth_units>
    <depth_mode>2</depth_mode>
    <log_crv_unit_meas>MV</log_crv_unit_meas>
    <unit_type_id>55</unit_type_id>
    <access_mode>.</access_mode>
    <top_depth>140.500000</top_depth>
    <base_depth>14694.500000</base_depth>
    <crv_increm>0.500000</crv_increm>
    <min_value>-108.849998</min_value>
    <max_value>73.830002</max_value>
    <api_code>0</api_code>
    <log_curve_vid>415</log_curve_vid>
    <remarks_ind>0</remarks_ind>
    <log_crv_alias>SP</log_crv_alias>
    <create_date>2000-10-06 09:58:06</create_date>
    <create_user_id>HXW200</create_user_id>
    <creation_routine>UNKNOWN</creation_routine>
    <update_date>2000-10-06 09:58:06</update_date>
    <update_user_id>HXW200</update_user_id>
    <update_routine>UNKNOWN</update_routine>
    <proxy>
            <project>OWDEMO</project>
            <wellid>167</wellid>
            <log_crv_name>SP</log_crv_name>
            <log_run_no>1</log_run_no>
            <log_crv_version>1</log_crv_version>
    </proxy>
</logcurve>
```

FIG. 15

Example Dynamic Common Format In XML

```xml
<?xml version = "1.0"?>

<result>
<common>
        <well>
            <uwi>6811</uwi>
            <wellname>ANCHOR 0130&POINT 99
12345678901234567890123456789012345678890</wellname>
            <latitude>22</latitude>
            <longitude>-95.000000</longitude>
            <proxy>
                    <project>OW&DEMO</project>
                    <wellid>0130</wellid>
            </proxy>
         <log>
            <proxy>
                    <project>OWDEMO</project>
                    <wellid>0128</wellid>
            <log_num>1</log_num>
            </proxy>
         <curve>
            <proxy>
                    <project>OWDEMO</project>
                    <wellid>0128</wellid>
            <log_num>1</log_num>
            <curve_num>2</curve_num>
            </proxy>
         </curve>
         <curve>
            <proxy>
                    <project>OWDEMO</project>
                    <wellid>0128</wellid>
            <log_num>1</log_num>
            <curve_num>1</curve_num>
            </proxy>
         </curve>
           </log>
           </well>
</common>
</result>
```

*FIG. 16*

```xml
<?xml version="1.0" encoding="UTF-8"?>

<xsl:stylesheet version="1.0"
    xmlns:xsl="http://www.w3.org/1999/XSL/Transform">

<!-- xsl:output method="xml" /-->
<!-- Common -> Catalog Stylesheet: Datatypes : Well,
        Log, Curve-->
<!--Aderbad Tamboli : 9/25/2000 -->

<xsl:template match="result">

<xsl:copy > <xsl:apply-templates select = "@*" />
        <xsl:apply-templates/>

<xsl:copy > </xsl:template> <xsl:template match =
        "@status">

<xsl:copy/> </xsl:template> <xsl:template match =
        "@curve">

<xsl:copy/> </xsl:template> <xsl:template match =
        "@well">

<xsl:copy/> </xsl:template> <xsl:template match =
        "@log">

<xsl:copy/> </xsl:template> <xsl:template match =
        "@pick">

<xsl:copy/> </xsl:template> <xsl:template match =
        "@core">

<xsl:copy/> </xsl:template> <xsl:template match =
        "@survey">

<xsl:copy/> </xsl:template> <xsl:template match =
        "common">

<catalog > <xsl:apply-templates/> </catalog>
        </xsl:template>
```

FIG. 17A

```
<!-- Well attributes -->
<!-- Putting only the attributes that have a different
     name-->
<!-- Similar tag named attributes get translated by
     the default rule at the bottom -->

<xsl:template match="well"> <well> <xsl:apply-
     templates/> </well> </xsl:template>

<xsl:templatematch="wellname"> <well_name>
     <xsl:apply-templates/> </well_name>
     </xsl:template>

<xsl:template match="welltype"> <well_type>
     <xsl:apply-templates/> </well_type>
     </xsl:template>

<xsl:template match="operater"> <operator> <xsl:apply-
     templates/> </operator> </xsl:template>

<xsl:template match="status"> <status> <xsl:apply-
     templates/> </status> </xsl:template>

<xsl:template match="totaldepth"> <total_depth>
     <xsl:apply-templates/> </total_depth>
     </xsl:template>

<xsl:template match="totaldepthunit">
     <td_units><xsl:apply-templates/> </td_units>
     </xsl:template>

<xsl:template match="field"> <field> <xsl:apply-
     templates/> </field> </xsl:template>

<xsl:template match="country"> <country> <xsl:apply-
     templates/> </country> </xsl:template>

<xsl:template match="state"> <state_or_province>
     <xsl:apply-templates/> </state_or_province>
     </xsl:template>

<xsl:template match="province"> <state_or_province>
     <xsl:apply-templates/> </state_or_province>
     </xsl:template>

<xsl:template match="county"> <county> <xsl:apply-
     templates/> </county> </xsl:template>
```

*FIG. 17B*

```
<xsl:template match="latitude"> <latitude> <xsl:apply-
     templates/> </latitude> </xsl:template>

<xsl:template match="longitude"> <longitude>
     <xsl:apply-templates/> </longitude>
     </xsl:template>

<xsl:template match="township"> <township> <xsl:apply-
     templates/> </township> </xsl:template>

<xsl:template match="range"> <range> <xsl:apply-
     templates/> </range> </xsl:template>

<xsl:template match="archivedby"> <archived_by>
     <xsl:apply-templates/> </archived_by>
     </xsl:template>

<xsl:template match="archiveddate"> <archived_date>
     <xsl:apply-templates/> </archived_date>
     </xsl:template>

<xsl:template match="uwi"> <uwi> <xsl:apply-
     templates/> </uwi> </xsl:template>

<xsl:template match="area"> <area> <xsl:apply-
     templates/> </area> </xsl:template>

<xsl:template match="offshore"> <offshore> <xsl:apply-
     templates/> </offshore> </xsl:template>

<xsl:template match="project"> <project> <xsl:apply-
     templates/> </project> </xsl:template>
```

*FIG. 17C*

```
<!-- log attributes -->

<xsl:template match="log"> <log> <xsl:apply-
        templates/>
</log> </xsl:template>

<xsl:template match="log/log_name"> <log_name>
        <xsl:apply-templates/> </log_name>
        </xsl:template>

<xsl:template match="log/log_run_no"> <log_run_no>
        <xsl:apply-templates/> </log_run_no>
        </xsl:template>

<xsl:template match="log/log_version"> <log_version>
        <xsl:apply-templates/> </log_version>
        </xsl:template>

<xsl:template match="log/log type"> <log type>
        <xsl:apply-templates/> </log_type>
        </xsl:template>

<xsl:template match="log/log_service"> <log_service>
        <xsl:apply-templates/> </log_service>
        </xsl:template>

<xsl:template match="log/bottom_depth_logged">
        <bottom_depth_logged> <xsl:apply-templates/>
        </bottom_depth_logged> </xsl:template>

<xsl:template match="log/depth_units"> <bd_units>
        <xsl:apply-templates/> </bd_units>
        </xsl:template>

<xsl:template match="log/elev_drill_floor">
        <elev_drill_floor> <xsl:apply-templates/>
        </elev_drill_floor> </xsl:template>

<xsl:template match="log/kb_elevation"> <kb_elevation>
        <xsl:apply-templates/> </kb_elevation>
        </xsl:template>

<xsl:template match="log/top_depth">
        <top_depth_logged> <xsl:apply-templates/>
        </top_depth_logged> </xsl:template>
```

*FIG. 17D*

```
<!-- Curve attributes -->

<xsl:template match="curve"><curve> <xsl:apply-
        templates/> </curve> </xsl:template>

<xsl:template match="curve/curve_name"> <curve_name>
        <xsl:apply-templates/> </curve_name>
        </xsl:template>

<xsl:template match="curve/curve_type"> <curve_type>
        <xsl:apply-templates/> </curve_type>
          </xsl:template>

<xsl:template match="curve/curve_version">
        <curve_version> <xsl:apply-templates/>
        </curve_version> </xsl:template>

<xsl:template match="curve/top_depth"> <top_depth>
        <xsl:apply-templates/> </top_depth>
        </xsl:template>

<xsl:template match="curve/bottom_depth">
        <bottom_depth> <xsl:apply-templates/>
        </bottom_depth> </xsl:template>

<xsl:template match="curve/depth_units"> <depth_units>
        <xsl:apply-templates/> </depth_units>
        </xsl:template>
```

*FIG. 17E*

```
<!-- Formation Tops attributes -->

<xsl:template match="formation_tops"> <formation_tops>
        <xsl:apply-templates/> </formation_tops>
        </xsl:template>

<xsl:template match="formation_tops/formation_name">
        <formation_name> <xsl:apply-templates/>
        </formation_name> </xsl:template>

<xsl:template match="formation_tops/formation_type">
        <formation_type> <xsl:apply-templates/>
        </formation_type> </xsl:template>

<xsl:template
        match="formation_tops/formation_depth"><formation
        _top_depth> <xsl:apply-templates/>
        </formation_top_depth> </xsl:template>

<xsl:template match="formation_tops/geologic_feature">
        <geologic_feature> <xsl:apply-templates/>
        </geologic_feature> </xsl:template>

<xsl:template match="formation_tops/formation_obs_no">
        <formation_obs_no> <xsl:apply-templates/>
        </formation_obs_no> </xsl:template>

<xsl:template match="formation_tops/formation_date">
        <formation_date> <xsl:apply-templates/>
        </formation_date> </xsl:template>

<xsl:template match="formation_tops/dip_angle">
        <dip_angle> <xsl:apply-templates/> </dip_angle>
        </xsl:template>

<xsl:template match="formation_tops/dip_azimuth">
        <dip_azimuth> <xsl:apply-templates/>
        </dip_azimuth> </xsl:template>
```

FIG. 17F

```
<!-- Deviation Survey attributes -->

<xsl:template match="deviation_survey">
        <deviation_survey>
   <xsl:apply-templates/> </deviation_survey>
        </xsl:template>

<xsl:template match="deviation_survey/survey_name">
        <survey_name> <xsl:apply-templates/>
        </survey_name> </xsl:template>

<xsl:template match="deviation_survey/survey_date">
        <survey_date> <xsl:apply-templates/>
        </survey_date> </xsl:template>

<xsl:template match="deviation_survey/survey_method">
        <survey_method> <xsl:apply-templates/>
        </survey_method> </xsl:template>

<xsl:template match="deviation_survey/data_source">
        <data_source> <xsl:apply-templates/>
        </data_source> </xsl:template>

<xsl:template
        match="deviation_survey/survey_calc_methd">
        <survey_calc_methd> <xsl:apply-templates/>
        </survey_calc_methd> </xsl:template>

<xsl:template
        match="deviation_survey/survey_conf_fact">
        <survey_conf_fact> <xsl:apply-templates/>
        </survey_conf_fact> </xsl:template>

<xsl:templatematch="deviation_survey/convergence_angle
        "> <convergence_angle> <xsl:apply-templates/>
        </convergence_angle> </xls:template>

<!-- end of Deviation Survey attributes -->
```

FIG. 17G

```
<!-- Core Attributes -->

<xsl:template match="cores"> <cores> <xsl:apply-
      templates/> </cores> </xsl:template>

<xsl:template match="cores/core_name"> <core_name>
      <xsl:apply-templates/> </core_name>
      </xsl:template>

<xsl:template match="cores/data_source"> <data_source>
      <xsl:apply-templates/> </data_source>
      </xsl:template>

<xsl:template match="cores/recovery_date">
      <recovery_date> <xsl:apply-templates/>
      </recovery_date> </xsl:template>

<xsl:template match="cores/core_type"> <core_type>
      <xsl:apply-templates/> </core_type>
      </xsl:template>

<xsl:template match="cores/run_number"> <run_number>
      <xsl:apply-templates/> </run_number>
      </xsl:template>

<xsl:template match="cores/job_number"> <job_number>
      <xsl:apply-templates/> </job_number>
      </xsl:template>

<xsl:template match="cores/top_depth"> <top_depth>
      <xsl:apply-templates/> </top_depth>
      </xsl:template>

<xsl:template match="cores/base_depth"> <base_depth>
      <xsl:apply-templates/> </base_depth>
      </xsl:template>

<xsl:template match="cores/analysis_report">
      <analysis_report> <xsl:apply-templates/>
      </analysis_report> </xsl:template>

<xsl:template match="cores/core_diam"> <core_diam>
      <xsl:apply-templates/> </core_diam>
      </xsl:template>

<!-- end of Core Attributes -->
```

FIG. 17H

```
<!-- Control attributes i.e. non Native specific -->

<xsl:template match="proxy"> <xsl:copy-of select="."/>
        </xsl:template>

<xsl:template match="error">
        <xsl:copy-of select="."/> </xsl:template>

<xsl:template match = "@*" > <xsl:copy />
        </xsl:template>

<xsl:template match = "well/*" priority="-0.5" />

<xsl:template match = "log/*"priority="-0.5" />

<xsl:template match = "curve/*" priority="-0.5" />

<xsl:template match = "formation_tops/*" priority="
        -0.5" />

<xsl:template match = "cores/*" priority="-0.5" />

<xsl:template match = "deviation_survey/* "priority="
        -0.5" />

</xsl:stylesheet>
```

| CATALOG RECORD | |
|---|---|
| FIELD NAME | FIELD TYPE |
| RECORD_ID | NUMBER |
| WELLNAME | STRING |
| UWI | STRING |
| OPERATOR | STRING |
| STATUS | STRING |
| WELLTYPE | STRING |
| TOTALDEPTH | NUMBER |
| TOTALDEPTHUNIT | STRING |
| LATITUDE | NUMBER |
| LONGITUDE | NUMBER |
| OFFSHORE | STRING |
| BODYOFWATER | STRING |
| FIELD | STRING |
| COUNTY | STRING |
| TOWNSHIP | STRING |
| STATEORPROVINCE | STRING |
| COUNTRY | STRING |
| ARCHIVEDBY | STRING |
| ARCHIVEDDATE | DATETIME |

- 1804 (RECORD_ID through OPERATOR)
- 1806 (STATUS through TOTALDEPTHUNIT)
- 1808 (LATITUDE through FIELD)
- 1810 (COUNTY through COUNTRY)

*FIG. 18*

| MEMBER METHOD | EXAMPLE ADAPTER CLASS | |
|---|---|---|
| | DESCRIPTION | |
| EXTRACT() | EXTRACT SPECIFIC DATA FROM A SPECIFIC NATIVE REPOSITORY | ← 1904 |
| INSERT() | INSERT SPECIFIC DATA INTO A SPECIFIC NATIVE REPOSITORY | ← 1906 |
| SPIDER() | SYNCHRONIZE A CATALOG WITH A SPECIFIC NATIVE REPOSITORY | ← 1908 |
| VALIDATE() | CONFIRM CURRENT VALIDITY OF A CATALOG ENTRY | ← 1910 |
| REGISTER() | REGISTER A NATIVE REPOSITORY IN A NATIVE REGISTRATION LIST IN A DATA INTEGRATION APPLICATION | ← 1912 |
| HANDLEMESSAGE() | IMPLEMENT REMOTE PROCEDURE CALLS AND DATA COMMUNICATIONS | ← 1914 |
| TRANSFORM() | CALL A TRANSFORMATION SERVICE TO TRANSFORM DATA FROM NATIVE MAPPING FORMAT TO DYNAMIC COMMON FORMAT | ← 1916 |
| ADAPTER() | CLASS CONSTRUCTOR, IN MANY EMBODIMENTS, AMONG OTHER PURPOSES, REGISTERS THE ADAPTER AND THE NATIVE REPOSITORY SERVED BY THE ADAPTER WITH A DATA INTEGRATION APPLICATION, TYPICALLY MAKING USE OF A CALL TO REGISTER() | ← 1918 |

METHOD, SYSTEM, AND PRODUCT FOR DATA INTEGRATION THROUGH A DYNAMIC COMMON MODEL

BACKGROUND OF THE INVENTION

Large masses of data reside in multiple databases, applications, file systems, repositories, or specialized data stores. The large masses of data are comprised of multiple models of multiple products of multiple vendors or manufacturers, all of which utilize different data structures and different database management systems including different user interfaces into their respective underlying databases. The data structures within databases even vary among versions of the same model from the same manufacturer. Adding to the complexity, many data stores are not even databases as such, comprising, for example, repositories of electronic files or documents stored in file systems under hierarchical directory structures.

Data integration is intended to enable a customer using one repository to make use of data residing in another repository. Data integration customers typically need to locate data in a source repository, transform the data from a source format to a destination format, and transfer the data from the source to the destination.

The most ambitious attempt in prior art to solve the problem of data integration is data warehousing based upon a standard data model. The idea of the standard model is that an industry, for example the seismic data processing industry or the geophysical data processing industry, gathers in committee and agrees on standard data formats for seismic data. The geophysical data processing industry is a good example of the need for data integration because the industry utilizes extremely large volumes of geophysical data regarding wells, well logs, and log curves. If the industry could agree on a standard data model, then the industry could build application programs to convert the multiple data models from various source databases into one standard model and use the data in standard form to transfer data among customers.

In one application of a standard model, data in the standard form is physically stored in a central location called a data warehouse which is then made available to subscribing customers who can make use of the data through applications designed to operate against the standard data model. It is useful to note that data warehousing, as the term is usually used in the data integration industry, does not require use of an industry-wide standard model. In fact, many data warehousing projects start with a group within a corporate entity establishing a local standard model for their own internal warehouse. This local standard model may or may not be based on any industry standard. However, when such a local standard model is established and used as a corporate standard, it behaves identically to an industry-based standard with all its inherent flaws and weaknesses.

The standard data model does, to some extent, ease access to data across structure types. The standard data model, however, demonstrates problems that seem intractable within the standard model itself. One problem is that the standard data model utilizes a completely static standard structure. That is, there is no method or system within the standard model for giving effect to routine changes in source system data structures. After the structure of a standard model is standardized by an industry standards committee (or a local data management group), the standard model structure is locked in place until changed by the committee.

The source data structures in the databases integrated by the standard model, however, change daily. The only way to change the standard model data structures to keep up with the changes in structures in industry databases is to gather a list of desired changes, take them to the industry standards committee, and request changes in the standard model. After the committee approves changes in the standard model, all applications desiring to use the new standard model, as well as the software processes, if any, comprising the model itself, must be rewritten, an extremely laborious, expensive, and time-consuming process.

A second problem with the standard model is data loss. The static nature of the standard model means that all data structure changes in industry databases not yet integrated into the standard model result in data loss every time data from an external repository is transferred into the standard model. In addition, the fact that the standard model data structure is established by committee means that it is a compromise practically never capable of including all fields from all databases for any record type. Neither the initial implementation of a standard model nor subsequent upgrades typically include all fields from all repositories contributing transferred data for a record type. For these reasons, actual utilization of a standard model for data integration almost always results in data loss.

For these reasons, and for other good reasons that will occur to the reader, there is an ongoing need for improved methods and systems for data integration.

SUMMARY

Aspects of the present invention include methods, systems, and products for data integration based upon dynamic common models. Aspects of the present invention typically include adapters as data communications interfaces between native data repositories and data integration applications. Aspects of the present invention typically include loose coupling between adapters and data integration applications. Aspects of the invention are summarized here in terms of methods, although persons skilled in the art will immediately recognize the applicability of this summary equally to systems and to products.

A first aspect of the invention includes methods of data integration including extracting a first native record from a first native repository, through a first adapter for the first native repository. In typical embodiments, the first adapter is loosely coupled for data integration to a data integration application, wherein the first native record from the first native repository has a first native format, and the first native format belongs to a category of formats identified as a datatype.

Typical embodiments include transforming, through the first adapter, the format of the first native record having the first native format to a dynamic common format, the dynamic common format being a subset of a dynamic common model, the dynamic common model comprising mappings specifying transformations to and from the dynamic common format for all data elements in all formats of all native records in all datatypes, whereby is produced a first native record having the dynamic common format.

Typical embodiments include transforming, through a second adapter, the format of the first native record having the dynamic common format from the dynamic common format to a second native format of a second native repository, the second native format belonging to a category of formats identified as datatypes, wherein the second adapter is loosely coupled for data integration to the data integration application, whereby is produced a first native record having attributes in the second native format. Typical embodiments include inserting, through the second adapter, the first native record having the second native format into the second native repository.

Other aspects of the invention include methods of creating systems implementing a dynamic common model, the systems typically including data integration applications, the methods typically including developing a first adapter for a first native repository, the first adapter being loosely coupled for data integration to the data integration application, the first native repository comprising first native records having first native formats, the first native formats belonging to categories of formats identified as datatypes. Typical embodiments further include developing a second adapter for a second native repository, the second adapter being loosely coupled for data integration to the data integration application, the second native repository comprising second native records having second native formats, the second native formats belonging to categories of formats identified as datatypes.

Typical embodiments include creating mappings specifying transformations of records: from the first native format to a first dynamic common format, from the first dynamic common format to the first native format, from the second native format to a second dynamic common format, and from the second dynamic common format to the second native format. Typical embodiments also include providing a transformation service capable of transforming formats in dependence upon the mappings, the transformation service coupled for data communications to the first adapter and to the second adapter. In typical embodiments, the data integration application is coupled for data communications to a multiplicity of native repositories through a multiplicity of adapters, and the multiplicity of adapters includes the first adapter and the second adapter.

In typical embodiments, all the adapters among the multiplicity of adapters are loosely coupled for data integration to the data integration application, and the data integration application includes the transformation service. In typical embodiments the dynamic common format is a subset of a dynamic common model, and the dynamic common model has the capability of specifying transformations to and from the dynamic common format for all formats of records in all datatypes of the multiplicity of native repositories.

A further aspect of the present invention includes methods of integrating an additional native repository with a system implementing a dynamic common model, the system including a data integration application. In typical embodiments, methods include developing an additional adapter for the additional native repository, the additional adapter being loosely coupled for data integration to the data integration application, the additional native repository comprising additional native records having at least one additional native format, the additional native format belonging to at least one category of formats identified as a datatype. Typical embodiments of this aspect include creating mappings specifying transformations of records: from the at least one additional native format to an additional dynamic common format, and from the additional dynamic common format to the at least one additional native format.

It is usual to view data in native repositories as sets of data elements. In this view, the integration achieved by the standard model is never more than an intersection of sets. The dynamic common model, however, is capable of a true union of all data elements selected for integration from all source repositories integrated through an embodiment of the invention. Because the standard model is static and includes from the beginning only agreed subsets of source data elements, the standard model never represents more than an intersection. In contrast, the dynamic common model of the present invention is capable at all times of transforming and transferring each and every data element from each and every source repository. If as a practical matter, users elect to integrate less than a full union of all data elements in all integrated native repositories for a particular embodiment, nevertheless, the dynamic common model remains capable of quickly effecting a full union if desired, a capability never available in the standard model for data integration.

The standard model itself provides no mechanism for changing or updating source data structures. In contrast, the dynamic common model itself comprises elements useful for automatically upgrading the dynamic common model to include changes in source repository structures. In fact, changes typically are administered in a similar manner as additions of new repositories. "Automatic upgrading" in this sense means that upon activation, a new adapter automatically registers itself and its new repository with a data integration application to which it is coupled for data communications and a spider then automatically enters in a catalog identifying information for all the records in the new repository served by the new adapter. The process for changing existing repositories or adding new repositories is extremely flexible and efficient, especially in contrast with the standard model in which such changes or additions are almost impossible and are not provided for within the model itself.

The foregoing and other objects, features and advantages of the invention will be apparent from the following more particular description of a preferred embodiment of the invention, as illustrated in the accompanying drawings wherein like reference numbers generally represent like parts of the invention.

BRIEF DESCRIPTION OF THE DRAWINGS

FIG. 12a illustrates an example embodiment of a native record format for a well.

FIG. 12b continues the illustration of an example embodiment of a native record format for a well.

FIG. 13 illustrates an example embodiment of a of native XML for a well.

FIG. 14a illustrates an example embodiment of a native record format for a well log curve.

FIG. 14b continues the illustration of an example embodiment of a native record format for a well log curve.

FIG. 15 illustrates an example embodiment of a of native XML for a well log curve.

FIG. 16 illustrates an example embodiment of a dynamic common format implemented in XML.

FIGS. 17a–17i illustrate an example mapping implemented in an XML stylesheet, more specifically:

FIG. 17a illustrates an embodiment of an XML stylesheet header, in the illustrated example embodiment directed to mapping dynamic common format to catalog XML.

FIG. 17b illustrates an example embodiment of mapping through an XML stylesheet from dynamic common format to catalog XML for a record of well datatype.

FIG. 17c continues the illustration of an example embodiment of mapping through an XML stylesheet from dynamic common format to catalog XML for a record of well datatype.

FIG. 17d illustrates an example embodiment of mapping through an XML stylesheet from dynamic common format to catalog XML for a record of well log datatype.

FIG. 17e illustrates an example embodiment of mapping through an XML stylesheet from dynamic common format to catalog XML for a record of well log curve datatype.

FIG. 17f illustrates an example embodiment of mapping through an XML stylesheet from dynamic common format to catalog XML for a record of formation tops datatype.

FIG. 17g illustrates an example embodiment of mapping through an XML stylesheet from dynamic common format to catalog XML for a record of well deviation survey datatype.

FIG. 17h illustrates an example embodiment of mapping through an XML stylesheet from dynamic common format to catalog XML for a record of well core datatype.

FIG. 17i illustrates an example embodiment of mapping through an XML stylesheet from dynamic common format to catalog XML for data elements having similar tag names in records of several datatypes.

FIG. 18 illustrates an embodiment of a catalog record.

FIG. 19 illustrates an example embodiment of an adapter base class.

DETAILED DESCRIPTION OF EXEMPLARY EMBODIMENTS

Figure 1:
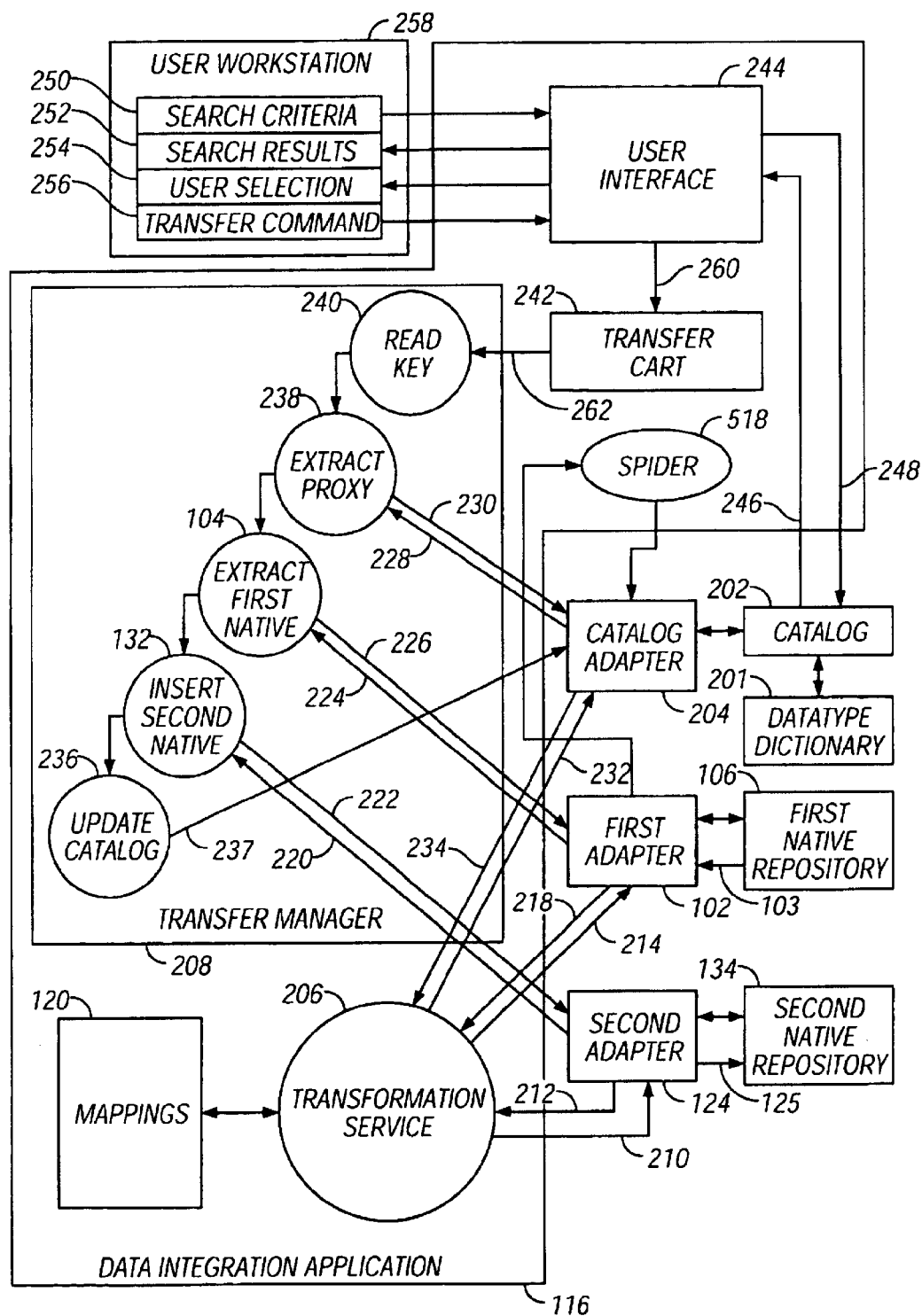
FIG. 1 is a process flow diagram of various embodiments of the invention.

The present invention is described primarily in terms of a method of data integration. Persons skilled in the art, however, will recognize that any computer system that includes suitable programming means for operating in accordance with the disclosed method also falls well within the scope of the present invention. The term "system" as used throughout this specification refers to computer systems or system comprising computers coupled, typically through networks, for data communications.

Suitable programming means include any means for directing a computer system to execute the steps of the method of the invention, including for example, systems comprised of processing units coupled to computer memory, which systems have the capability of storing in computer memory programmed steps of the method of the invention for execution by a processing unit. The term "processing unit" includes arithmetic logic circuits configured to execute methods implemented in embodiments of the invention. Such arithmetic logic circuits typically operate in dependence upon electronic memory circuits configured to store representations of methods implemented in embodiments of the invention. In this specification, the terms "system," "computer system," and "data processing system" are used as synonyms. The terms "memory" and "computer memory" are used as synonyms in this specification. "Memory" or "computer memory" includes both electronic memory circuits such as random access memory and read-only memory, as well as various forms of magnetic or optical memory storage such as compact disks, magnetic diskettes, and fixed or removable disk drives.

Embodiments of the invention include computer program products, such as diskettes, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product.

The present invention is particularly concerned with computer data, and it is useful to clarify the usage of particular terms, consistent with their usual usage in the computer industry. For example, this specification distinguishes databases and data repositories, using "database" to refer to aggregates of files having regular record structures usually capable of organization in rows and columns and typically included under administration of database management systems.

This specification uses the term "repository" to include databases, but also to include data stores other than databases, data stores, in which, for example, data records may be stored in file systems under hierarchical directory structures rather than in databases as such. "Native repositories" are data stores outside a data integration application subject to integration by use of a data integration application.

Individual data elements are referred to as "data elements" or as "fields." Aggregates of data elements are called "records." The organization of fields within records is referred as "data format," simply as "format," or sometimes as "data structure."

Aggregates of records are called "files." "Tables" are a category of files having records and fields capable of orderly arrangement in rows and columns, a characteristic not necessarily shared by all files.

With respect to software programs or processes, this specification uses the terms "process" to mean a computer program, or a routine within a computer program, stored in random access memory either ready to execute or presently under execution. "Thread" refers to a lightweight process or thread of execution. The term "program" is used more generally to refer to an aggregate of computer instructions that may still be in storage outside random access memory and may in fact still be in uncompiled source code form. Referring to callable segments of software typically accepting data parameters and returning return data, values or strings, the terms "routine," "member method" and "function" are used as synonyms.

The present invention regards methods, systems, and products for data integration. FIG. 1 illustrates example embodiments of the present invention typically as including a spider (518), a metadata catalog (202), a transfer manager (208), a transformation service (206), and adapters (102, 124, 204). Embodiments of the present invention function generally to allow users to identify data located among multiple databases or data repositories, referred to as "native repositories," coupled for data communications, and to transfer identified data from one repository to another. The repositories have multiple internal data formats. Embodiments of the present invention include the capability of transforming the data format of data transferred from a source repository (typically referred to in this specification as a "native repository") to a destination repository (another native repository) from the format of the source repository into the format of the destination repository. Data transformations in embodiments of the present invention typically utilize mappings comprising subsets of a dynamic common model referred to as "dynamic common formats."

A "dynamic common model" is an aggregate of all mappings to and from native formats and dynamic common formats within a data integration application. It is a characteristic of typical embodiments of the present invention that their dynamic common models provide the capability of including such mappings for all data elements in all datatypes in all native repositories integrated through a particular data integration application. In the case of an embodiment utilizing XML stylesheets for mappings, for example, a dynamic common model comprises all mappings implemented in all the stylesheets present in the embodiment. The use or presence of a dynamic common model does not mean that all data elements in all integrated native repositories are actually available for transfer at every moment in time. Human operators naturally have discretion to include or exclude particular data elements. The use of a dynamic common model within the meaning of the present invention, however, does assure that every data element in every integrated native repository can be provided for transfer within the model almost immediately merely by adding or altering one adapter and adding or altering one or two mappings. It is in this sense that it is said that the dynamic common model provides the capability of a true union of all data elements in all supported datatypes in all native repositories integrated through a data integration application.

Data transformations in embodiments of the present invention typically utilize also an additional intermediate format called a "native mapping format." The usefulness of the native mapping format is that in typical embodiments it is implemented in the same underlying technology as the dynamic common formats and the dynamic common model, thus enabling the transformation service always to administer all its inputs and outputs in the same general manner. For example, many embodiments of the present invention utilize XML to implement the dynamic common formats and the native mapping formats. Choosing XML as the underlying technology for the formats to be input to the transformation service enables the transformation service to be implemented as an XSL translator, and the mappings (120) that drive the transformation service to be XML stylesheets. Embodiments of the invention, therefore, have the advantage of presenting to and receiving from their transformation services file records or documents formulated in terms of a single technology. This approach, as will be seen, greatly simplifies data integration.

"XML" of course refers to the well-known standard "Extensible Markup Language." XSL translators are well known computer applications that translate XML documents. Many embodiments of the present invention utilize XSL translators in transformation services. Many embodiments utilize XML stylesheets as guides for XSL translations. In the terminology of the present specification, such XML stylesheets embody "mappings" of data transformations. It is usual to think of XSL translators as translating XML to HTML. An XSL translator, however, is in fact a general-purpose translating engine that, in most embodiments of the present invention, for example, is used to translate from one XML format into another XML format.

"Adapters" are implementations of interfaces between native repositories and other elements of embodiments, particularly transfer managers and spiders. Each adapter serves one native repository. Registering an adapter with a data integration application is the same as registering the native repository served by the adapter. And vice versa: registering a native repository for data integration is typically the same as registering its adapter. Adapters function to extract (224) from native repositories (106) data to be transferred. Adapters, or their extract routines, provide the capability of calling a transformation service (218), passing to the transformation service data in a native mapping format, accepting (214) from the transformation service data transformed into a dynamic common format, and providing (224) the transformed data in dynamic common format to other elements of an embodiment such as a data integration application (116) or a transfer manager (208) within a data integration application. Adapters also provide the capability of inserting data into destination repositories (134). Adapters' insert routines typically receive (222) data in dynamic common format and call a transformation service (212) to transform the data into a native mapping format, after which the adapter transforms the data into the native format required by the destination repository.

Adapters in typical embodiments are loosely coupled to data integration applications including transfer managers, transformation services, and spiders. "Loosely coupled" generally means "data-driven." More specifically, "loosely coupled" means that all changes in operations of typical embodiments of the invention as between adapters and data integration applications are effected by mere changes in text or other kinds of data in, for example, tables, mapping files or documents, or configuration files, with no need for changes in computer programming, computer source code, or executable computer code.

"Changes in operations" means changes needed to address alterations of native repositories, either changes in the structures of repositories already integrated in an existing system, or changes needed to integrate an additional repository into an existing system. In, for example, the case of embodiments utilizing XML for mapping data transformations, changes in operations resulting from modification of an existing repository or addition of a new one, as between the adapter for the affected repository and a data integration application to which the adapter is coupled, require modifications to or addition of no more than two XML stylesheets, mere changes in, or creations of, text files, changes effected with a word processor or text editor, changes requiring no computer programming whatsoever.

Changes in operations often do, in typical examples, however, require computer programming for, of, or within an adapter. Adapters typically are tightly coupled to native repositories. In this context, "tightly coupled" means that changing the structure or operation of an already-integrated repository, or integrating an additional repository, typically requires at least some computer programming within an adapter. Some data conversion operations are not amenable to loose coupling. For example, the category of data conversion operations typically referred to as "rules" or "business rules" is resistant to loose coupling. "Business rules" are requirements for data conversion that cut across records, such as, for example, a requirement that a field contain the sum of values from several other fields in other records. Conversion or transformation of such fields requires manipulations that are difficult or impossible to do in a purely data-driven fashion. It is one of the benefits of the present invention that the location of rules-based programming requirements is concisely focused in adapters immediately adjacent to native repositories and that, except for the data conversion relations between an adapter and the native repository served by the adapter, all other data conversion relations in typical embodiments are loosely coupled.

Persons skilled in the art, however, will recognize that the scope of computer programming required in adapters for such changes in operations typically are minimal, needing to address through a single adapter only the changes in data elements affected within a changed repository. The fact that adapters are tightly coupled to native repositories does not diminish in any way the benefits of loose coupling to data integration applications.

Adapter routines are typically called by transfer managers and by spiders. A transfer manager (208) is an application operated as part of a data integration application that includes the capabilities of ordering extraction (104) of native repository records from one repository and ordering insertion (132) of the extracted records into a second native repository. Naturally, in order to carry out such transfers including extractions and insertions, the transfer manager must know where to extract the data from and where to insert it. Embodiments utilizing transfer managers therefore typically include in transfer managers the capabilities of reading (240) catalog keys and destination codes from a transfer cart (242) wherein are stored such information deposited there in response to a user's request to execute a transfer. Transfer managers call adapter extract routines to retrieve data to be transferred, and the adapters' extract routines return data to be transferred in common format. An adapters is capable of returning data in common format because, before providing transfer data to the transfer manager, the adapter's extract routine calls a transformation service to transform the data format from its source format to common format.

In many embodiments, transfer managers, or rather software functions, methods, or routines within transfer managers, call (222) adapter insert routines to provide transferred data for insertion into a destination repository. In such embodiments, transferred data is provided by the transfer manager to the destination adapter's insert routine in dynamic common format, and the destination adapter insert routine calls a transformation service (212) to convert the transfer data from dynamic common format to a destination native mapping format.

In many embodiments, transfer managers function by reading from transfer carts catalog keys identifying catalog records storing proxy data for native records to be transferred, the proxy data identifying the exact source repository and location within source repositories of the data records to be transferred. In such embodiments utilizing transfer managers, an extract routine in the transfer manager typically calls (226) an adapter extract routine in an adapter for a source repository and passes proxy data to the adapter, receiving the return of data in dynamic common format from the source adapter. In such embodiments, an insert routine in the transfer manager typically calls an adapter insert routine in a destination adapter and passes the transfer data to the destination adapter in dynamic common format for transformation and insertion into a destination repository.

Some embodiments effect transfers of each transfer record separately. Some embodiments concatenate proxy data for all records to be extracted from a particular source repository so that such records are extracted through a single call to the adapter extract routine for that source repository. Because such concatenated calls may effect transfers of large quantities of data, some embodiments concatenate proxy data for records to be extracted from a particular source repository so that such records are extracted through more than one call to the adapter extract routine for that source repository, each such call being subject to a maximum block size to optimize efficiency in data transfer.

In typical embodiments, as shown in FIG. 1, transformation services transform data from a native mapping format into dynamic common format and from dynamic common format into a native mapping format. In many embodiments in which dynamic common formats and native mapping formats are implemented in XML, adapters calling transformation services provide to the transformation service the source data in XML documents that the transformation service uses to locate in an XML stylesheet database an XML stylesheet containing rules for translating the source data to common format. An XML stylesheet database typically in such embodiments contains two XML stylesheets for each native repository, one stylesheet for transformation from native mapping format to dynamic common format and one for transformation from dynamic common format to native mapping format. After locating a stylesheet, for calls from source adapters, the transformation service, in typical embodiments utilizing XML, passes the source data in native mapping format and the stylesheet to an XSL translator which in turn is guided by the stylesheet in translating the source data into dynamic common format and returning a new XML document to the calling adapter, the new XML document comprising the transfer data in dynamic common format. For calls from destination adapters, of course, the translation is from an XML document comprising data in dynamic common format to an XML document comprising data in native mapping format.

Catalogs are databases having their own adapters. Catalogs are databases containing data about data, or "metadata," so that "catalogs" are sometimes referred to as "metadata catalogs." Metadata in catalogs includes identifying attributes or data elements useful to allow users to identify data available for transfer among other native repositories. Metadata in catalogs includes also proxy data or data identifying specific locations of particular data records in native repositories.

Spiders (518) are software applications that populate catalogs. Spiders typically are included as parts of data integration applications (116). Spiders function to maintain in a catalog a current listing of all data available through that catalog for transfer by users among native repositories. Spiders call specialized extract routines in source adapters and specialized insert routines in catalog adapters. Unlike transfer managers, however, spiders do not identify data to be transferred by reference to a transfer cart. Moreover, spiders typically do not transfer native records in their entirety as transfer function typically do. In contrast, spiders transfer only identifying attributes and proxy data from native repositories to catalogs, and spiders identify data to be transferred not by reference to proxy data, but by transferring data regarding all native records in a repository or all native records in a repository having a date or time stamp later than a last spider date or a last spider time.

The term "date stamp" or "time stamp" refers to data elements in native records representing the last date and time when native records were changed in any way, altered, added, deleted, or updated. Because the purpose of spidering native repositories is to maintain in a catalog current accurate identifying attributes and proxy data for all records in integrated native repositories, many embodiments track the last spider date and time and spider only those native records having date/time stamps later than the last spider date and time for the repository in which the native records are located.

In typical embodiments, spiders identify data to be transferred in terms of time. With reference to time data, spiders serve two kinds of native repositories, repositories having update time stamps on native records and repositories having no such time stamps. In many embodiments, for all native repositories integrated by a data integration application, spiders maintain a file of records identifying all such repositories including a time and date entry on each such record indicating the last time the subject repository was spidered. In this specification, the term "spider" is sometimes used as a verb to refer to the process of extracting from a repository identifying information for data in the repository and inserting the identifying information into a catalog.

In typical embodiments, the extract routines in adapters for repositories with update time stamps are capable of accepting a last-spider time from a calling routine in a spider and extracting only those repository records having time stamps that indicate updates after the last-spider time for the particular repository. Extract routines in adapters for repositories without update time stamps typically upon request from a spider's calling routine extract the entire source repository each time the source repository is spidered. In some embodiments, spiders are called manually; in other embodiments, spiders are run by cron jobs. "Cron" refers to the well known UNIX daemon for launching application at times identified in a UNIX system table commonly known as a "cron tab." Despite the fact that "cron job" is UNIX jargon, this specification uses the term "cron job" in a generic sense to refer to any launching by any computer operating system, not just UNIX, of a spider into a separate process or thread of execution at a preset time stored in non-volatile computer memory, such as a cron table or 'crontab.'

In typical embodiments, spiders can accept as parameters the last-update time for a repository and an identification of the repository to be spidered. The time parameter in some embodiments comes from a crontab. In other embodiments the time parameter is provided manually by a user. In other embodiments the time parameter is read from a registration list where are stored last spider times for native repositories integrated under a data integration application. For spidering source repositories not supporting internal update time stamps, some embodiments of spiders accept a time parameter coded to indicate the need to spider the entire repository. Other embodiments of spiders for repositories without update time stamps ignore the time parameter because the associated repository adapter's specialized extract routine for spiders is programmed to extract the entire repository every time the specialized extract routine is called. The extract routines called by spiders in typical embodiments are specialized for spidering, returning in a dynamic common format data elements comprising identifying attributes and proxy data, the different data elements being different from the data elements returned in common format to transfer managers, the different data elements being those needed for updating a catalog.

Embodiments of the invention typically include a subsystem called a user interface, typically installed and operating on a web server or a network application server, capable of reading display data from a catalog and displaying across a network onto user workstations or personal computers information identifying data available for transfer among native repositories. The catalog in typical embodiments is a database operating under a database management system including database files comprising information identifying the locations and kinds of data ("identifying attributes") available for transfer as well as the exact locations ("proxy data") of particular data within particular native repositories. The identifying attributes, or some part of them, are displayed through user interfaces for users on user workstations in response to users' queries comprising search parameters entered through the user interface. The user interface in typical embodiments also provides the capability for users to indicate which of the native records identified by displayed identifying attributes is to be transferred and the destination of each transfer. Displays of identifying attributes typically include identification of pertinent native repositories. Indeed, native records describing oil well logs, seismic surveys, or a tulip growers typically are available from several native repositories. User prompts at transfer time therefore in some embodiments include both the source and the destination of the transfer.

In typical embodiments, identifying attributes for display through a user interface are organized consistently across a datatype. More specifically, in the example case of well logs, on a display screen of a user workstation, it is useful for all well logs to have similar and logical display appearance regardless of the physical nature of identifying attributes actually stored in a catalog. It is usual, therefore, in typical embodiments of the invention to include a datatype dictionary (201), coupled for data communications to a catalog, to map physical identifying attributes to logical identifying attributes. The physical identifying attributes are the identifying attributes stored in a catalog as a result of spider operations and data transfers. The logical identifying attributes are reorganizations of the logical identifying attributes for logical, consistent display appearance. The datatype dictionary is organized according to datatypes because the usual display consistency is organized around datatypes. It is typical to display identities of tulip growers, for example, in a format that is consistent across tulip growers but different from displays of well logs, tulip growers belonging to or having, in the terminology of the invention, a datatype. Well logs, having their own separate datatype, also have their own logical format for display of identifying attributes, typically established in a datatype dictionary.

In typical embodiments, a user interface provides the capability for the user to order execution of a transfer, to transfer particular identified data from a source native repository to a destination native repository. User interfaces in such embodiments are capable, when ordered to do so, of writing to a transfer cart catalog keys from the identifying attributes for all native records ordered transferred by the user. It is the transfer manager in typical embodiments that then reads the catalog keys from the transfer cart and uses a catalog key to find in the catalog the proxy data needed to locate in a native repository a particular native record selected for transfer. The transfer manger then calls an extract routine in the adapter for the source repository identified in the identification data.

In overview therefore of typical operation, a user requests through a user interface (244) identification information for a datatype, passing to the user interface search parameters (250). The user interface searches (248, 246) a catalog (202) and returns for display logical identifying attributes (252) fitting the user's request. The user interface then supports various sorting and selecting functions (254) on behalf of the user, including enabling the user affirmatively to indicate which data records are to be transferred and the destinations of the transfers. The user's last act before transfer is to instruct the user interface to begin transfer (256). The user interface then, in typical embodiments, writes a catalog key into a transfer cart (242), one key for each transfer record.

A transfer manager regularly scans (240) the transfer cart to read catalog keys from cart records. The transfer manager then uses the catalog keys to locate (238) in the catalog the proxy data for the transfer records, passing the proxy data to an adapter for the source repository by calling (226) an extract routine within the adapter. The adapter extracts (103) the data from the source repository (106) and converts it to common format by calling a transformation service (218). After transformation, the adapter returns the data in common format to the transfer manager (224).

The transfer manager in a typical embodiment then calls (222) an insert routine in the destination adapter serving the destination repository (134). The destination adapter converts the common format to native format by calling a transformation service. After transformation the destination adapter inserts (125) the transfer data into the destination repository (134), returning to the transfer manager new identifying attributes and proxy data for the newly inserted record in the destination repository (220). If the insertion was successful, so that the destination now contains data it did not contain before the transfer, the transfer manager updates (236) the catalog by calling (237) an insert routine in an adapter for the catalog. It is useful to note that in typical embodiments, this particular routine updating of a catalog at the conclusion of a successful transfer is administered directly by the transfer manager rather than a spider.

In many embodiments of the present invention, additions of new repositories to the system of the invention require only three things: a new adapter and a two new mappings for conversion of the new source format to common format. In embodiments utilizing XML stylesheets for mappings, the requirement is one new adapter and two new stylesheets. In typical embodiments, an additional native repository, upon joining a data integration system, receives a new adapter, and the adapter automatically upon activation registers with the data integration application, and the contents of the new repository are then spidered automatically into a catalog, making the contents of the new repository immediately available to users of the invention.

In typical embodiments, a new adapter for an additional native repository requires some additional programming to alter or develop routines to convert data formats from the raw native format of an additional repository to and from a native mapping format. In embodiments utilizing XML, programming typically is needed within a new adapter to convert data formats between the raw native format and a native XML format. It is useful to note that creating a new XML stylesheet does not involve computer programming. Creating a new XML stylesheets is merely a matter of text entry, often done merely through a word processor or text editor.

Principal elements of typical embodiments, user interfaces, transfer managers, transformation services, adapters, catalogs, and spiders are implemented as computer applications, capable of installation and operation all on the same computer or upon separate computers coupled, generally through networks, for purposes of data communications. Principal elements of typical embodiments, particularly the adapters and transfer managers, communicate with one another through remote procedure calls implemented in various ways, including, for example, through CORBA objects or through JDBC objects. Some embodiments utilize custom-programmed remote procedure calls. Persons skilled in the art will recognize that all methods of accomplishing efficient data communications among principal elements of embodiments are well within the scope of the invention.

"CORBA" refers to the Common Object Request Broker Architecture, a standard for interoperability as promulgated by the Object Management Group of Framingham, Mass. "JDBC" refers to the well known Java Database Connectivity standard, which includes a standardized API for SQL-oriented database access." And "SQL" refers to the Structured Query Language, a known standard for database access.

Figure 2:
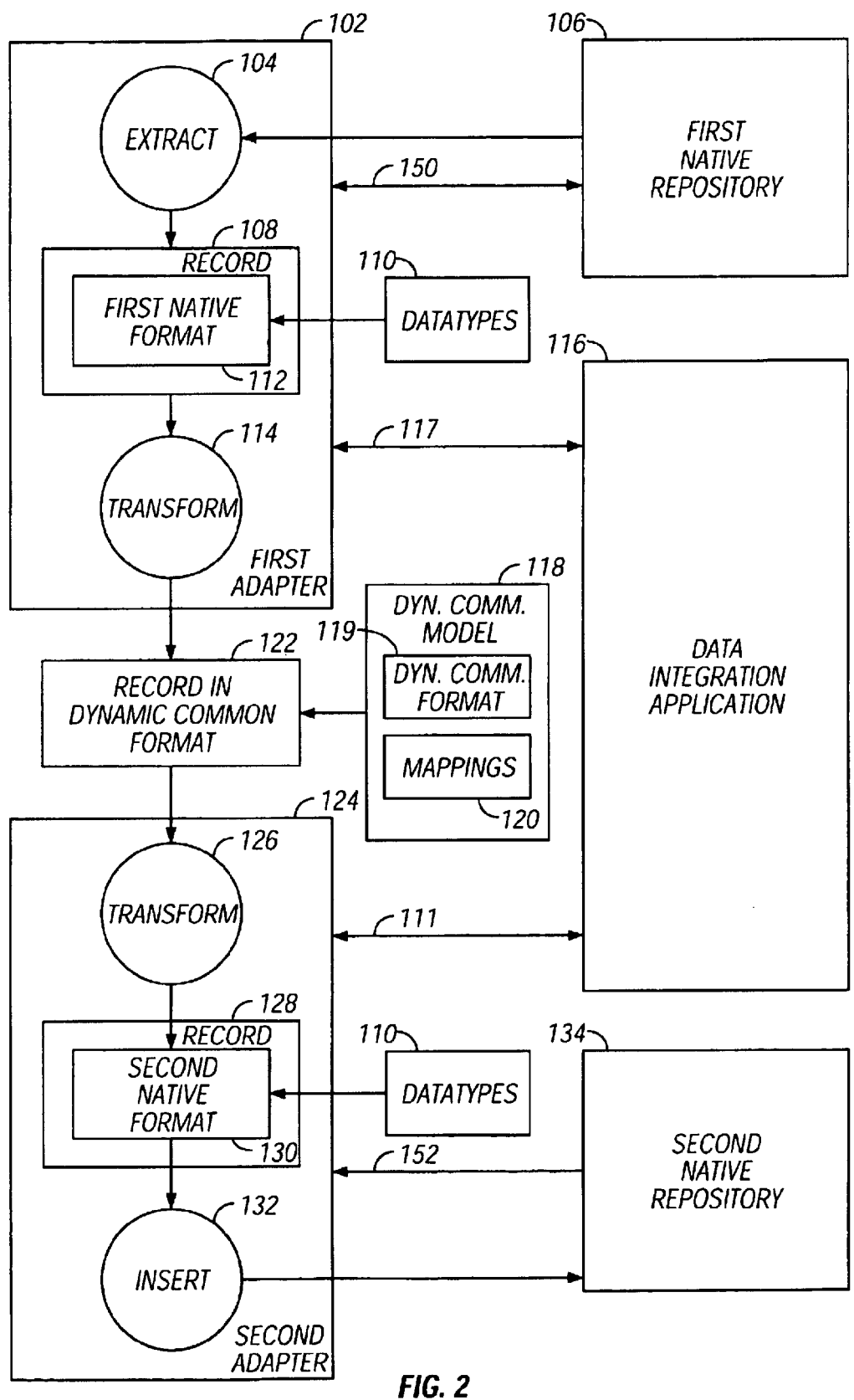
FIG. 2 is a high-level process flow diagram of embodiments of the invention.
Figure 3:
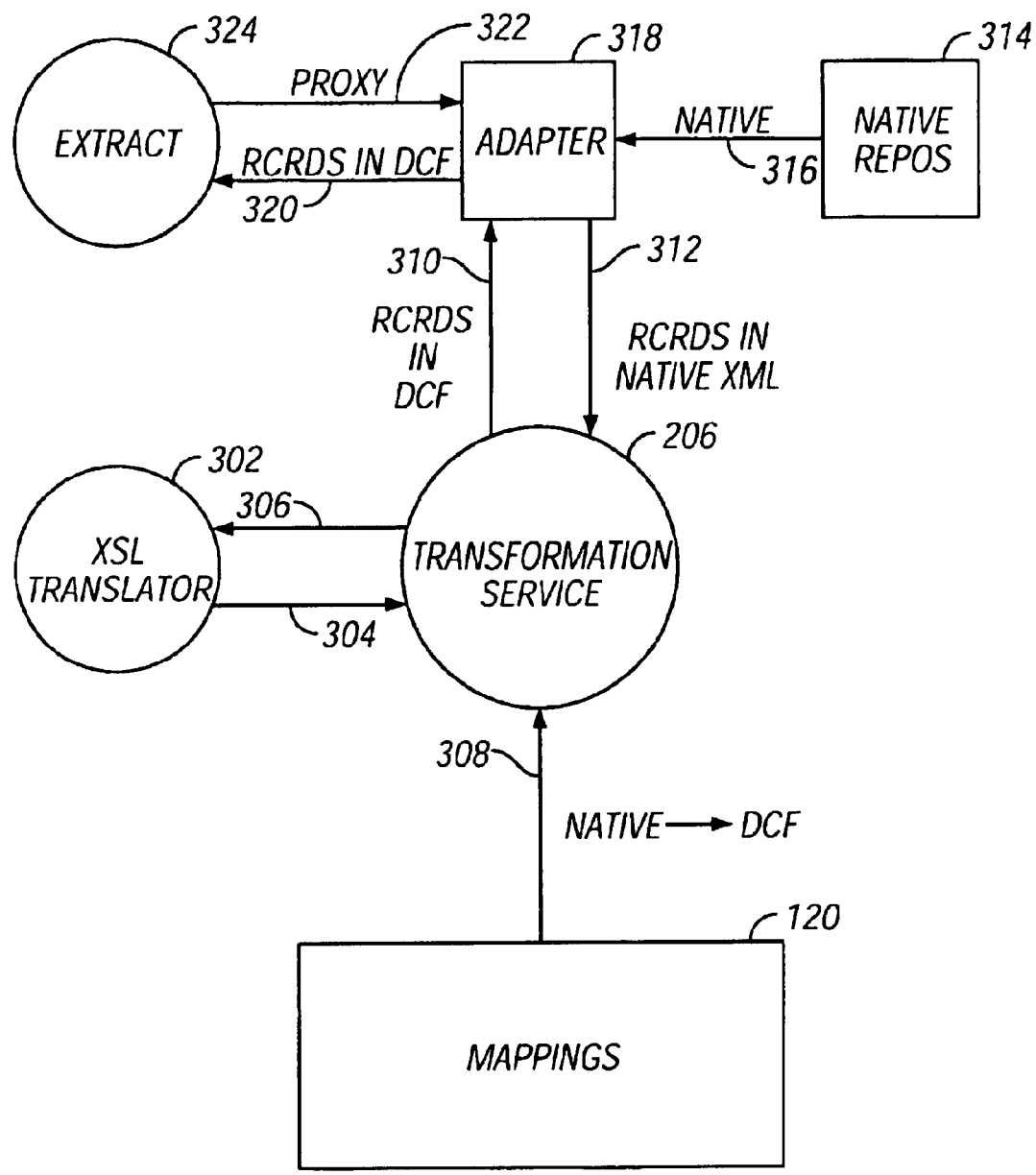
FIG. 3 is a more detailed process flow illustration of embodiments of extraction with respect to an adapter and a transformation service.
Figure 4:
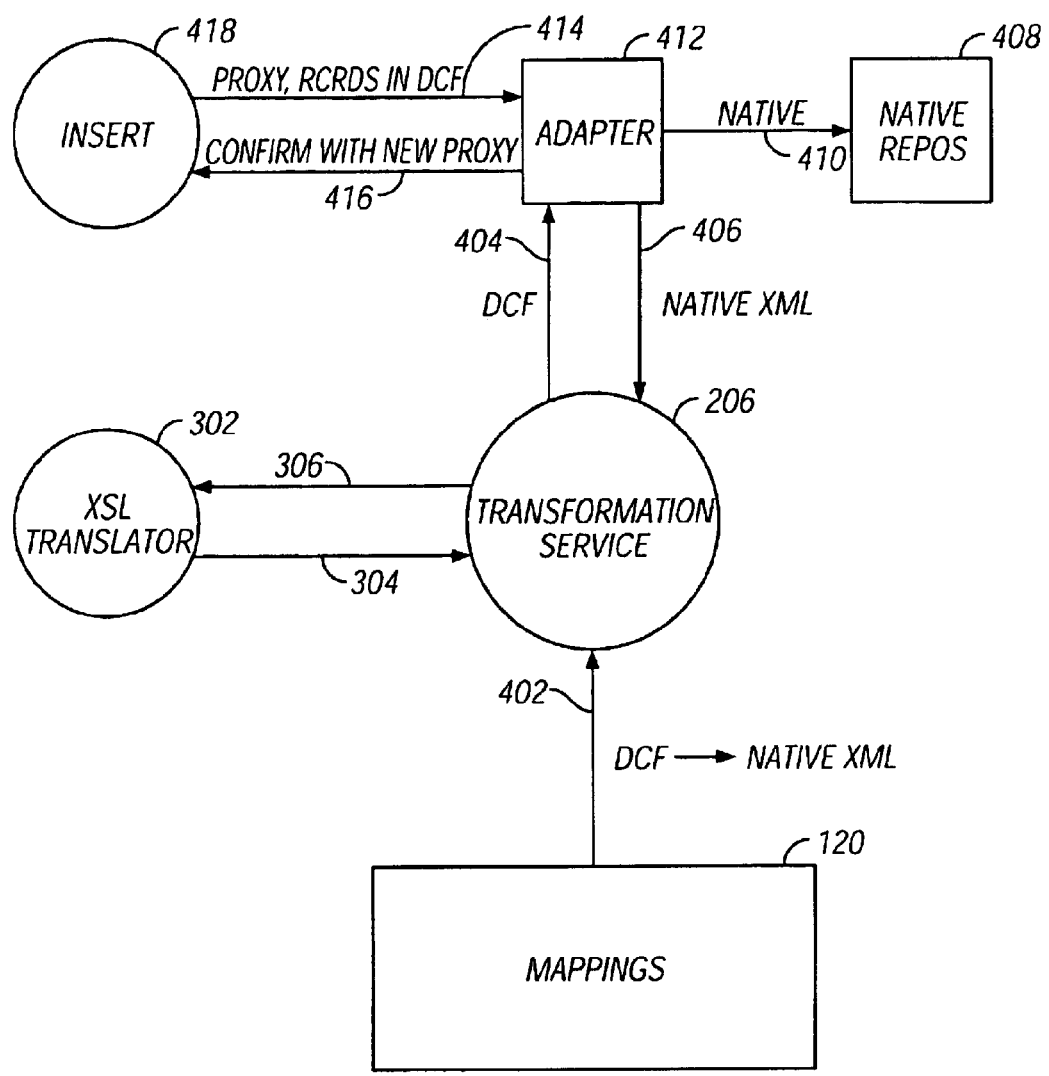
FIG. 4 is a more detailed process flow illustration of embodiments of insertion with respect to an adapter and a transformation service.

Turning now to FIG. 2, an aspect of the invention is seen as a method of data integration. An example embodiment illustrated in FIG. 2 includes extracting (104) a first native record (108) from a first native repository (106), through a first adapter (102) for the first native repository. The first adapter (102) in the illustrated embodiment is loosely coupled for data integration (117) to a data integration application (116). In an embodiment as illustrated in FIG. 2, the first native record (108) from the first native repository (106) has a first native format (112), and the first native format belongs to a category of formats identified as a datatype (110).

A further embodiment illustrated in FIG. 2 includes transforming (114), through the first adapter (102), the format of the first native record (108) having the first native format to a first native record having a dynamic common format. In the illustrated example embodiment, the dynamic common format is a subset of a dynamic common model (118). Typical embodiments implement many datatypes. The dynamic common model (118) in typical embodiments includes mappings (120) specifying transformations to and from the dynamic common format for all data elements in all formats of all native records in all datatypes implemented in an embodiment.

A further embodiment, illustrated also in FIG. 2, includes transforming (126), through a second adapter (124), the format of the first native record (122) having the dynamic common format to a first native record having a second native format of a second native repository (134), the second native format belonging to a category of formats identified as datatypes (110). In the illustrated embodiment, the second adapter (124) is loosely coupled for data integration to the data integration application (116). As shown for the illustrated embodiment, the result of this transformation is a first native record (128) having attributes (130) organized in the second native format.

A further embodiment, illustrated also in FIG. 2, includes inserting (132), through the second adapter (124), the first native record (128) having the second native format into the second native repository (134).

Figure 6:
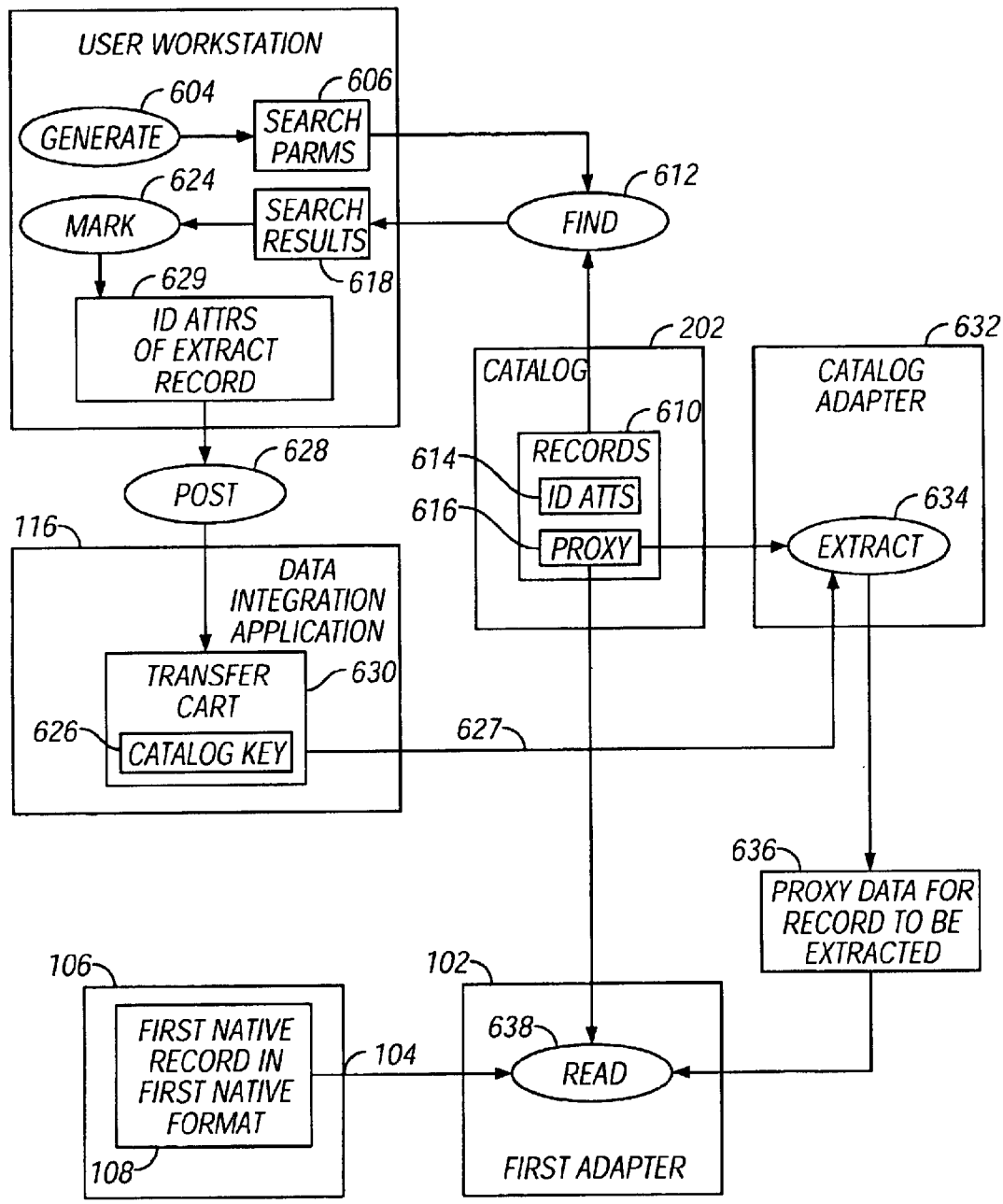
FIG. 6 is a further illustration of embodiments with particular regard to extraction.

A still further embodiment is shown in FIG. 6 to include generating (604) search parameters (606) capable of supporting a search for the first native record (108). The illustrated embodiment of FIG. 6 includes finding catalog records corresponding to the search parameters. More specifically, the illustrated embodiment includes finding (612), in a catalog (202), in dependence upon search parameters (606), catalog records (610) having identifying attributes (614) that match the search parameters (606). In typical embodiments, as shown in FIG. 6, the identifying attributes for each catalog record include a catalog key for each catalog record.

A "catalog key" is a group of data elements uniquely identifying a catalog record. Catalog keys in some embodiments comprise a single data element. In other embodiments, multiple data elements are used as a catalog key to uniquely identify a catalog record.

In typical embodiments, as shown in FIG. 6, the catalog (202) comprises identifying attributes (614) and proxy data (616) for all native records (610) in a multiplicity of native repositories. In typical embodiments, as shown in FIG. 6, the multiplicity of native repositories comprises the first native repository (106). In typical embodiments, as shown in FIG. 6, at least one found catalog record contains identifying attributes that identify the first native record (108).

A still further embodiment, shown also in FIG. 6, includes marking (624) for extraction the identifying attributes of the at least one found catalog record containing identifying attributes that identify the first native record. A still farther embodiment, shown also in FIG. 6, includes posting (628), from the marked identifying attributes, a catalog key (626) to a transfer cart (630) in the data integration application (116). A still further embodiment, shown also in FIG. 6, includes extracting (634), in dependence upon (627) the posted catalog key (626), from the catalog (202) through a catalog adapter (632) proxy data (616) for the first native record (108).

In typical embodiments, as shown in FIG. 6, the proxy data (616) comprises data representing the location of the first native record (108) in the first native repository (106). In typical embodiments, as shown in FIG. 6, extracting (104) a first native record (108) from a first native repository (106) further comprises reading (638), in dependence upon the proxy data (616), through the first adapter (102), from the first native repository (106), the first native record (108) having a first native format.

Figure 7:
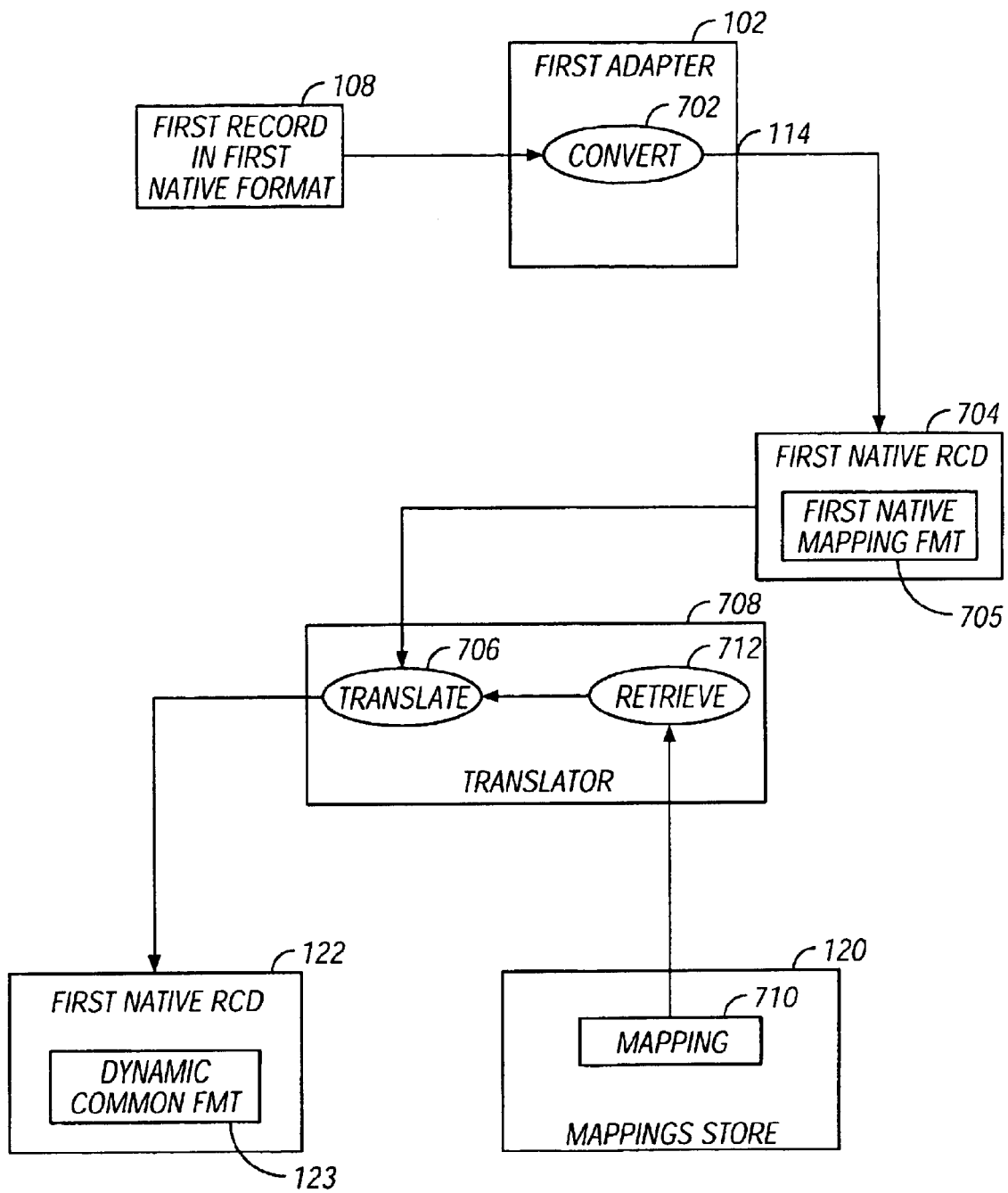
FIG. 7 is a further illustration of embodiments with particular regard to insertion.

A more detailed example embodiment of transforming (114) the format of the first native record (108) having the first native format, illustrated in FIG. 7, includes converting (702), through the first adapter (102), the first native record (108) having the first native format to a first native record (704) having a first native mapping format. The illustrated embodiment of FIG. 7 includes retrieving (712) from a mapping store (120) a first mapping (710), wherein the first mapping (710) specifies a data transformation from the first native mapping format to the dynamic common format. The illustrated embodiment of FIG. 7 includes translating (706), through a translator (708), in dependence upon the first mapping (710), the first native record (704) having a first native mapping format to first native record (122) having a dynamic common format.

In many embodiments of the kind illustrated in FIG. 7, the first mapping (710) comprises a first XML stylesheet, the translator (708) comprises an XSL translator, the first native mapping format (705) is implemented in XML, the dynamic common format (123) is implemented in XML, the first native record (704) having a first native mapping format is a first XML document, and the first native record (122) having dynamic common format is a second XML document.

Figure 8:
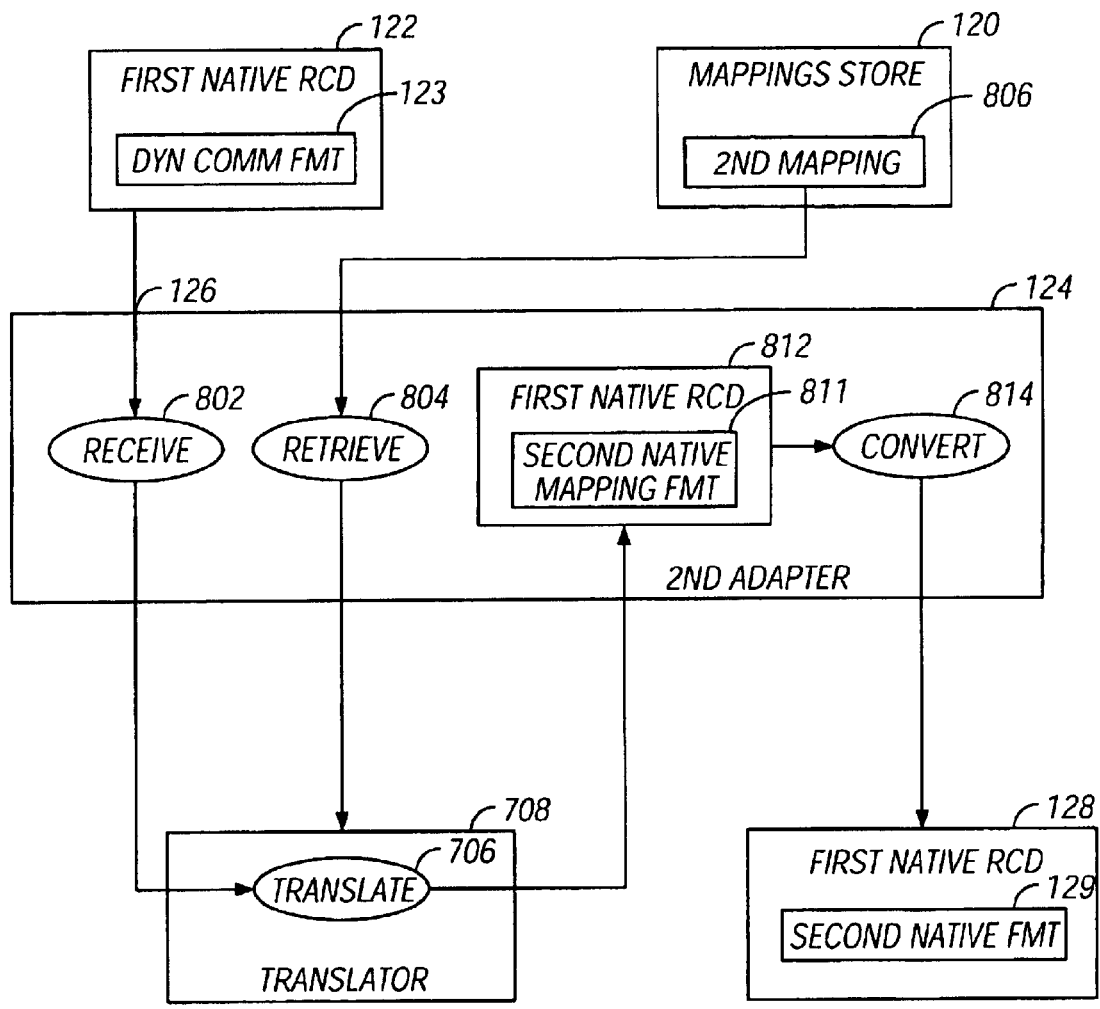
FIG. 8 is a further illustration of embodiments with particular regard to mapping formats.

A further embodiment of transforming (126) the format of the first native record (122) having the dynamic common format, as shown in FIG. 8, includes receiving (802), through a second adapter (124), a first native record (122) having the dynamic common format. The embodiment of FIG. 8 includes retrieving (804) from a mappings store (120) a second mapping (806), wherein the second mapping (806) specifies a data transformation from the dynamic common format to a second native mapping format. A further embodiment, shown also in FIG. 8, includes translating (706), through a translator (708), in dependence upon the second mapping (806), the first native record (122) having the dynamic common format, into a first native record (812) having the second native mapping format. The illustrated embodiment includes converting (814), through the second adapter (124), the format of the first native record (812) having the second native mapping format into a first native record (128) having the second native format.

In many embodiments of the kind illustrated in FIG. 8, the second mapping (806) comprises an XML stylesheet, the translator (708) is an XSL translator, the dynamic common format (123) is implemented in XML, the second native mapping format (811) is implemented in XML, the first native record (122) having the dynamic common format is a first XML document, and the first native record (812) having a second native mapping format comprises a second XML document.

Figure 9:
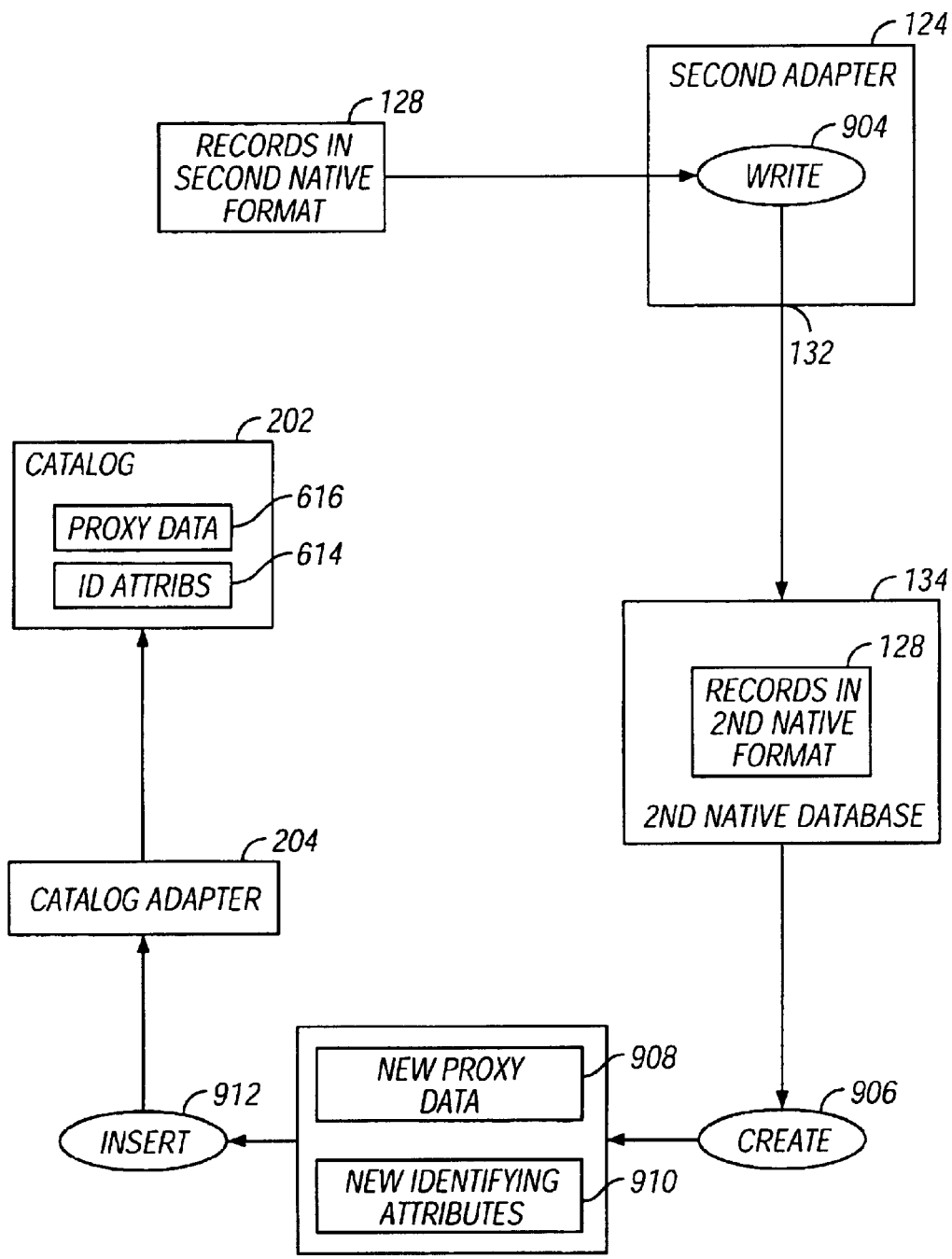
FIG. 9 is a further illustration of embodiments with particular regard to administration of proxy data and identifying attributes for catalogs.

A more detailed embodiment of inserting (132) through the second adapter (124), shown in FIG. 9, includes writing (904), through the second adapter (124), the first native record (128) having the native format of the second native repository (134) into the second native repository (134), thereby creating a new native record. The example embodiment shown in FIG. 9 includes creating (906) new proxy data (908) and identifying attributes (910) for the first native record (128) having the native format of the second native repository (134), that is, new proxy data and identifying attributes for the new native record. The example embodiment of FIG. 9 also includes inserting (912) the new proxy data (908) and identifying attributes (910) through a catalog adapter (204) into a catalog (202). In the kind of embodiment shown in FIG. 9, the catalog (202) typically comprises identifying attributes (614) and proxy data (616) for all native records in a multiplicity of native repositories. In typical embodiments, the multiplicity of native repositories includes the second native repository (106).

Figure 5:
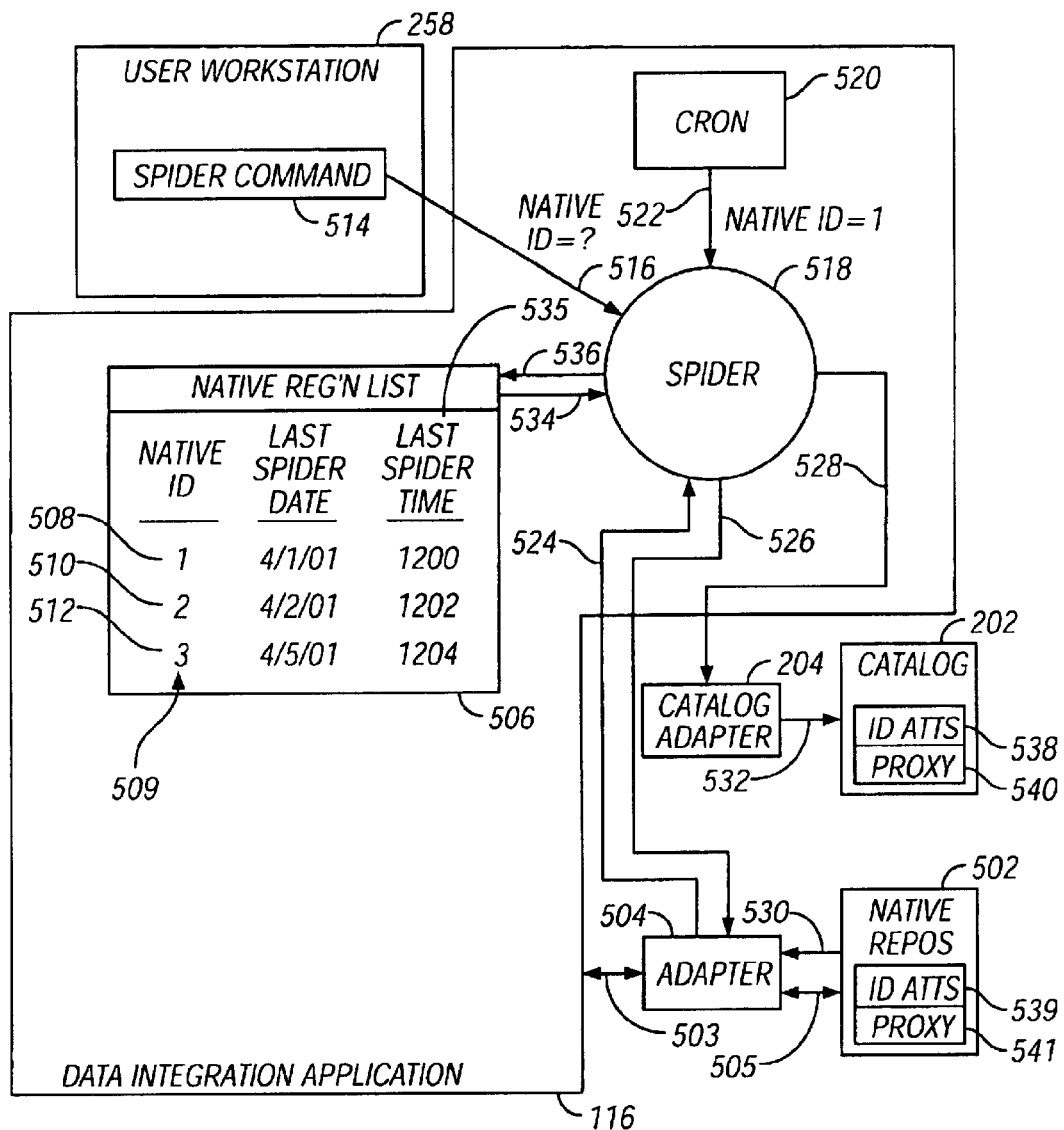
FIG. 5 illustrates embodiments of process flow for spidering.

Turning now to FIG. 5, an embodiment is seen using a spider to populate a catalog. More specifically, a further embodiment shown in FIG. 5 includes spidering (518) through a spider (518) proxy data (541) and identifying attributes (539) from a single native repository (502) to a catalog (202). In the illustrated example embodiment, the single native repository (502) is coupled (505) for data communications to an adapter (504), and the adapter (504) is coupled (503) for data communications to a data integration application (116). The illustrated the data integration application (116) includes the spider (518).

In an embodiment illustrated in FIG. 5, the catalog (202) comprises a database of identifying attributes (538) and proxy data (540) for all native records in a multiplicity of native repositories, and the multiplicity of native repositories include the single native repository (502).

In a more specific example embodiment, also shown in FIG. 5, spidering (518) includes providing (522) to the spider (518) an identification code for the single native repository (502). In some embodiments, spiders are provided repository identification codes as parameters of calls (522) from cron jobs that begin spider execution. "Cron job" refers to the well known UNIX utility for automated scheduling of software program execution under the UNIX operating system. Although an example is shown in FIG. 5 starting a spider from a cron utility (520), persons skilled in the art will immediately recognize that any tool or utility, functional under any computer operating system, can be used to schedule spider operations and that the use of any automated scheduler for starting spiders is well within the scope of the present invention.

Other embodiments will enable manual operation of a spider in that a user is provided on a workstation (258) interface elements, such as typical known elements of graphical user interfaces, mouse-clickable buttons, pull-down menus, and the like, from which a user manually starts a spider. In such embodiments, the data integration application is programmed to prompt the user for native repository identification (516) when a spider (518) is manually ordered (514) by a user.

A further embodiment as shown in FIG. 5 includes reading (534), in dependence upon an identification code (509) for a single native repository, from a native repository registration list (506) a last spider time (535) for the native repository (502) to be spidered. A still further embodiment as shown in FIG. 5 includes retrieving (524, 526) from the single native repository native records having time stamps later than the last spider time. Some native repositories do not support native records having time stamps. For a native repository not supporting time stamps, each spider call to such a repository retrieves proxy data and identifying attributes for all native records in the repository.

A still further embodiment also illustrated in FIG. 5 includes creating (530), in dependence upon the retrieved native records, proxy data (541) and identifying attributes (539). Creating proxy data in this kind of embodiment includes providing, for each record in the single native repository meeting the spider timing requirements, sufficient data elements to uniquely find each such record in the single native repository. For native records using single-field unique keys, a datatype and a single data element will be sufficient to locate a particular record. For native records using multiple-field unique keys, a datatype and more than one key data element are needed to locate a particular record. For native repositories that do not use database management technology as such, other modes of proxy data are used, such as, for example, specific file system location such as disk drive identification codes, directory and sub-directory names, and file names. Persons skilled in the art recognize by now that any formulation of data elements capable of specifying the location in a repository, a data store, a database, a file system, or in any other form of computer data storage, of a particular file or record representing, implementing, or supporting a datatype is fully useful as proxy data within the present invention.

Identifying attributes are data elements comprising a description of the thing that is represented by the native record. The identifying attributes are useful for displaying on a user workstation interface to enable a user to select records for transfer. Consider an example involving oil wells, and distinguish for purposes of illustration identifying attributes and proxy data. Identifying attributes, information a user finds useful for selecting data to transfer, includes well location, latitude, longitude, well depth, age of a well, geological characteristics of a well, and so on. In contrast, proxy data purely identifies the location of a well record in a native repository. In other words, identifying attributes describe the thing represented by a data record, whereas proxy data describes the location in a native repository of the data record itself.

A still further embodiment also illustrated in FIG. 5 includes writing (532) to the catalog (202), through the catalog adapter (528, 204), the proxy data (541) and identifying attributes (539). A still further embodiment also illustrated in FIG. 5 includes updating (536) the last spider time (535) in the native repository registration list (506). So that users will have the last spider time and last spider date available for convenient reference, typical embodiments maintain the last spider date and last spider time in storage regardless whether native repositories spidered do or do not support time stamps on native records.

Some users take the view that there is no need to maintain in storage last spider time or last spider date for native repositories not supporting time stamps on grounds that there is no need to provide last spider time in spidering such repositories because the last spider time will not be used. Spidering such repositories always retrieves proxy data and identifying attributes for all records in the repository, regardless of the last spider time or last spider date. Some alternative embodiments, therefore, do not maintain last spider data and last spider time for native repositories that do not support time stamps on native records.

Figure 10:
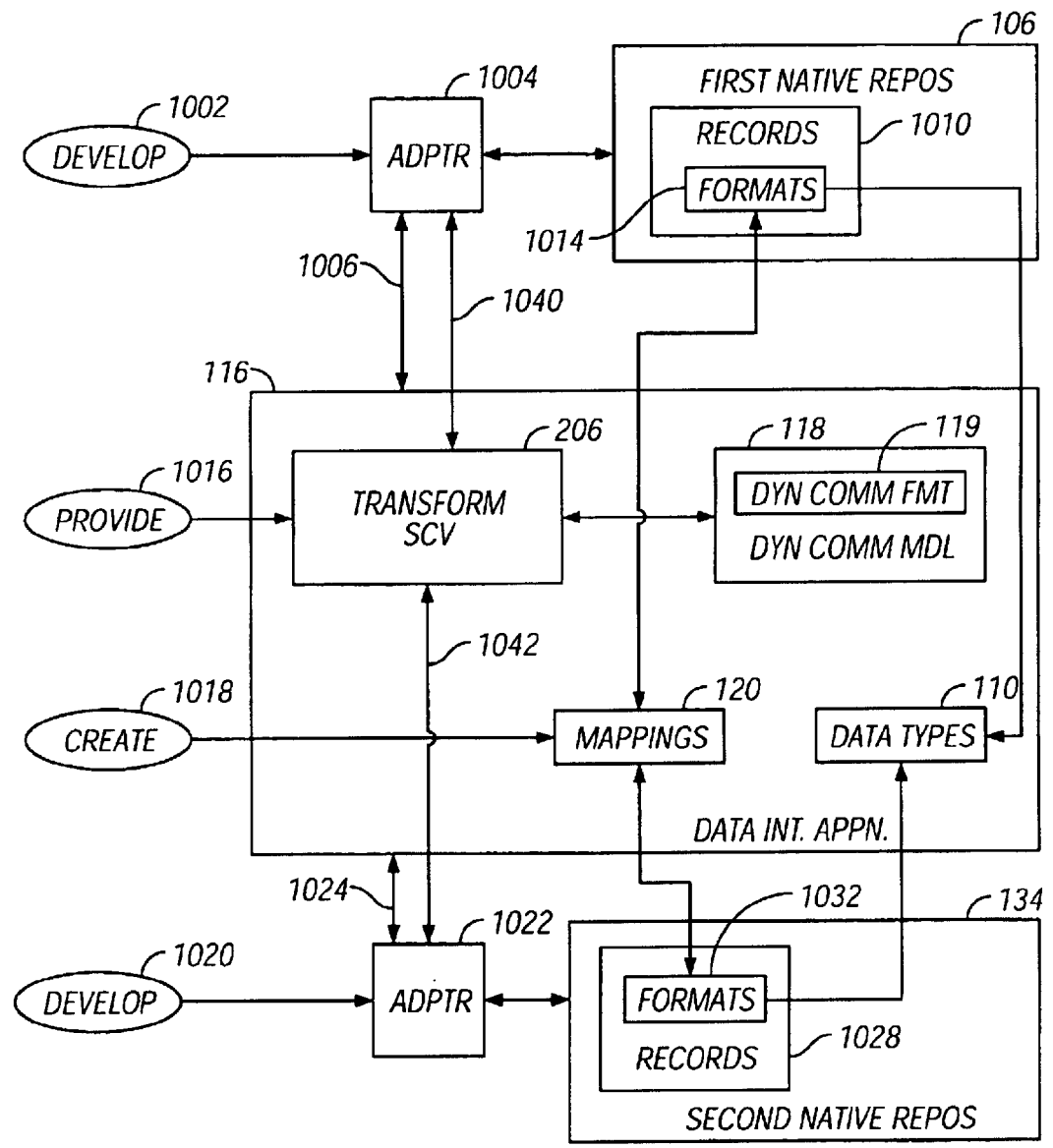
FIG. 10 is a high-level process flow for embodiments of the aspect including creating systems implementing dynamic common models.

Turning now to FIG. 10, a further aspect of the invention is seen, a method of creating a system implementing a dynamic common model. In an embodiment shown in FIG. 10, the system includes a data integration application, and the method includes developing (1002) a first adapter (1004) for a first native repository (106). In the example embodiment of FIG. 10, the first adapter is loosely coupled for data integration (1006) to the data integration application (116), and the first native repository includes first native records (1010) having first native formats (1014). In the illustrated embodiment, the first native formats belong to categories of formats identified as datatypes (110).

A further embodiment, shown also in FIG. 10, includes developing (1020) a second adapter (1022) for a second native repository (134). The second adapter is loosely coupled for data integration (1024) to the data integration application of the illustrated embodiment. Also in the illustrated embodiment, the second native repository includes second native records (1028) having second native formats (1032), and the second native formats belong to categories of formats identified as datatypes (1012).

Figure 10A:
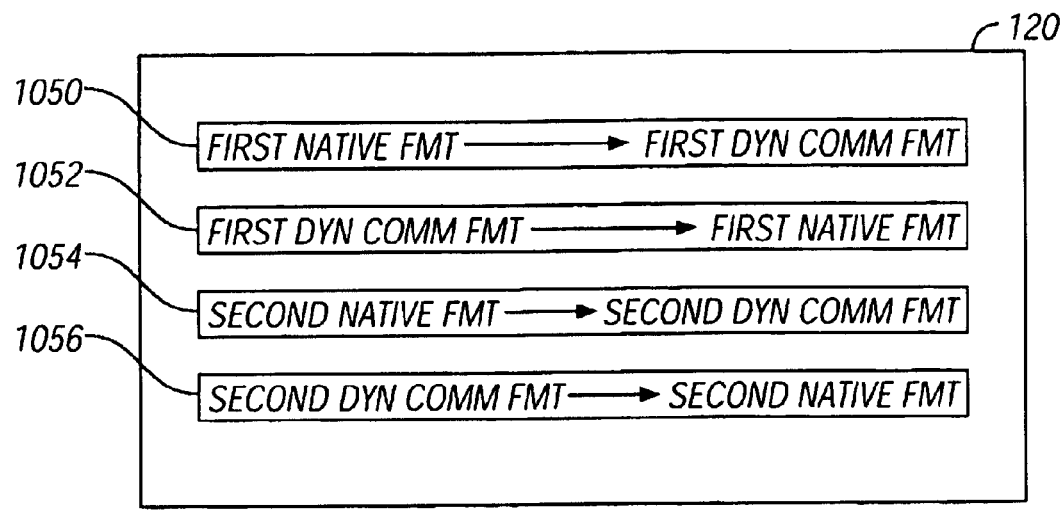
FIG. 10a is a more detailed illustration with respect to embodiments of mappings.

A still further embodiment, shown also in FIG. 10, includes creating (1018) mappings (120) specifying transformations of records. The mappings (120) created in the exemplary embodiment are shown in more detail in FIG. 10a as a mapping (1050) from the first native format to a first dynamic common format, a mapping (1052) from the first dynamic common format to the first native format, a mapping (1054) from the second native format to a second dynamic common format, and a mapping (1056) from the second dynamic common format to the second native format.

A further embodiment, shown also in FIG. 10, includes providing (1016) a transformation service (206) capable of transforming formats (1014, 1032) in dependence upon the mappings (120), the transformation service coupled (1040, 1042) for data communications to the first adapter (1040) and to the second adapter (1042). In some embodiments, providing a transformation service includes programming data conversion routines for converting data elements, one by one, from one format to another. In other embodiments, providing a transformation service includes installing and configuring an XSL translator.

In embodiments of the kind illustrated in FIG. 10, the data integration application (1024) is coupled for data communications to a multiplicity of native repositories through a multiplicity of adapters, and the multiplicity of adapters includes the first adapter and the second adapter. In such embodiments, all the adapters among the multiplicity of adapters typically are loosely coupled for data integration to the data integration application, and the data integration application comprises the transformation service.

In embodiments of the kind illustrated in FIG. 10, the dynamic common format (119) is a subset of a dynamic common model (118), and the dynamic common model has the capability of specifying transformations to and from a dynamic common format for all formats of records in all datatypes in a multiplicity of native repositories. In some embodiments, the multiplicity of native repositories consists of only the first native repository and the second native repository. That is, some embodiments practice the present invention with no more than two native repositories, while other embodiments have many native repositories coupled through adapters to at least one data integration application.

Figure 10B:
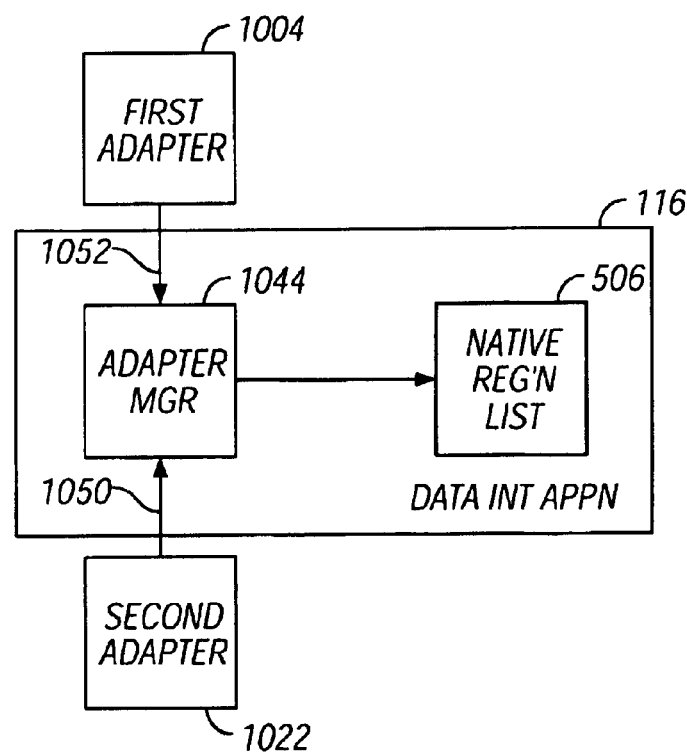
FIG. 10b illustrates embodiments utilizing an adapter manager.
Figure 10C:
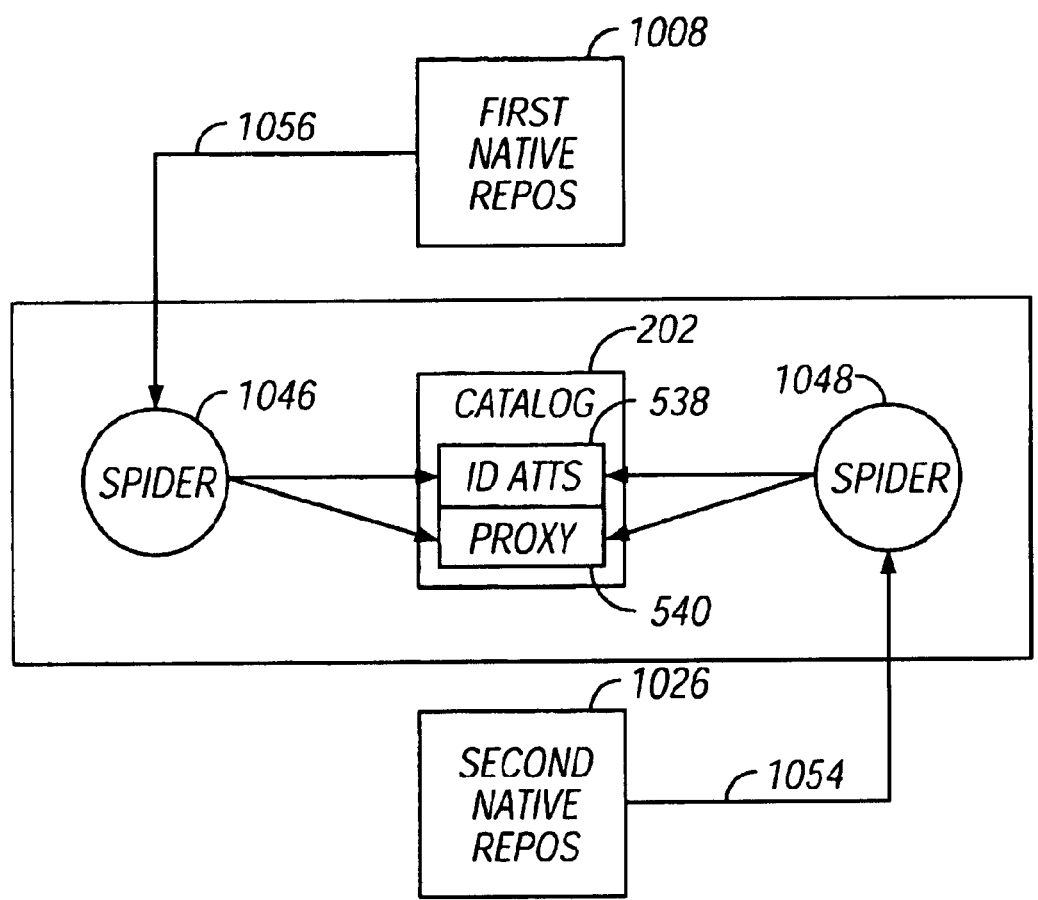
FIG. 10c illustrates embodiments spidering native repositories pursuant to creating systems implementing dynamic common models.

A more detailed embodiment, illustrated at FIG. 10b, includes registering (1050, 1052), through an adapter manager (1044) in a data integration application (116), the adapters for the first native repository and the second native repository. Embodiments of the present aspect of the invention typically include also, as shown in FIG. 10c, populating (1054, 1056), through spiders (1046, 1048), a catalog (202) in the data integration application (116) with identifying attributes (538) and proxy data (540) for all records of all datatypes in the first native repository and the second native repository.

Figure 11:
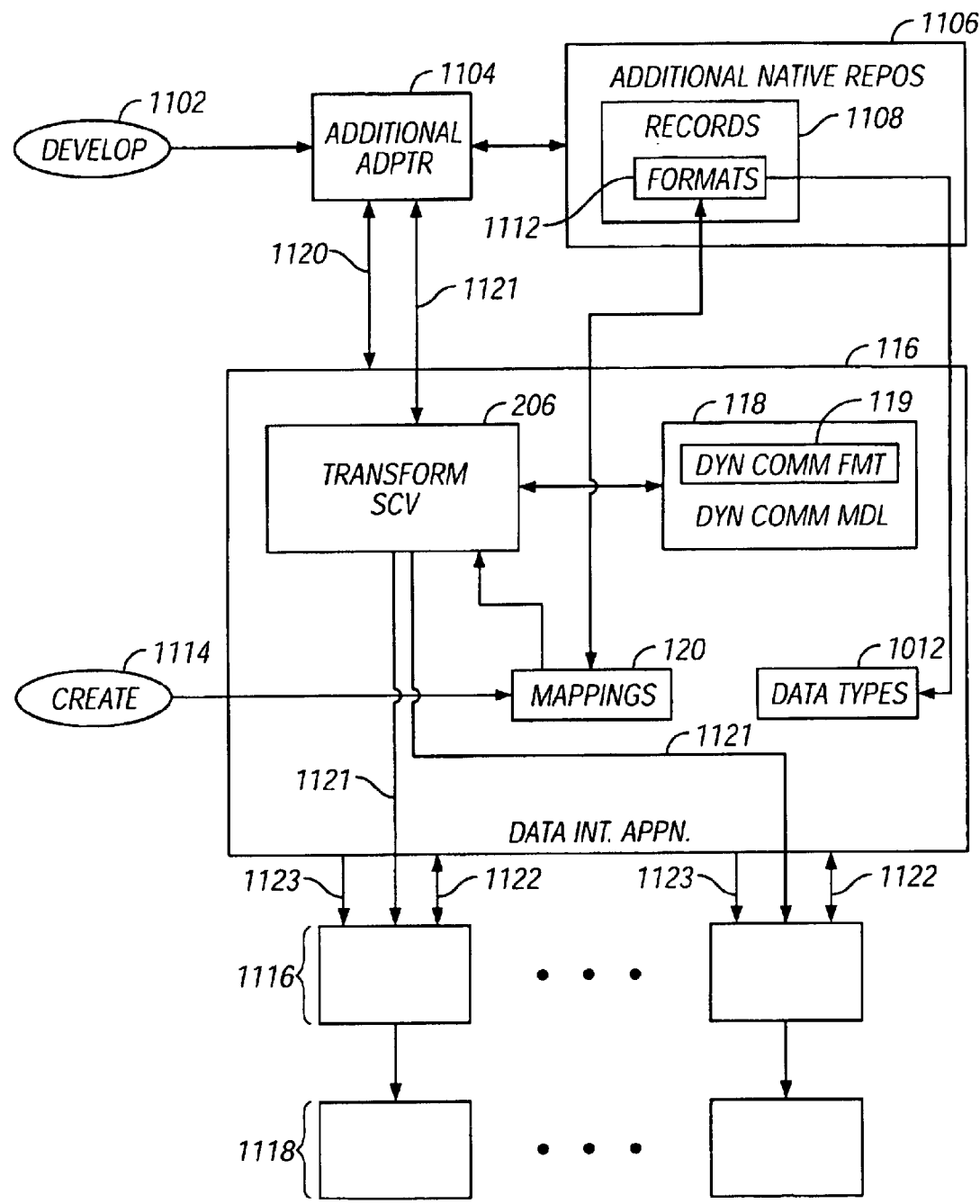
FIG. 11 is a high-level process flow for embodiments of the aspect including integrating additional native repositories into systems implementing dynamic common models.

Turning now to FIG. 11, a further aspect of the invention is seen, a method of integrating an additional native repository with a system implementing a dynamic common model, in which the system includes a data integration application. The embodiment shown in FIG. 11 includes developing (1102) an additional adapter (1104) for the additional native repository (1106). In the embodiment illustrated in FIG. 11, the additional adapter is loosely coupled for data integration (1120) to the data integration application (116), and the additional native repository includes additional native records (1108) having additional native formats (1112). In the embodiment shown in FIG. 11, the additional native formats belonging to categories of formats identified as datatypes (1012).

Figure 11A:
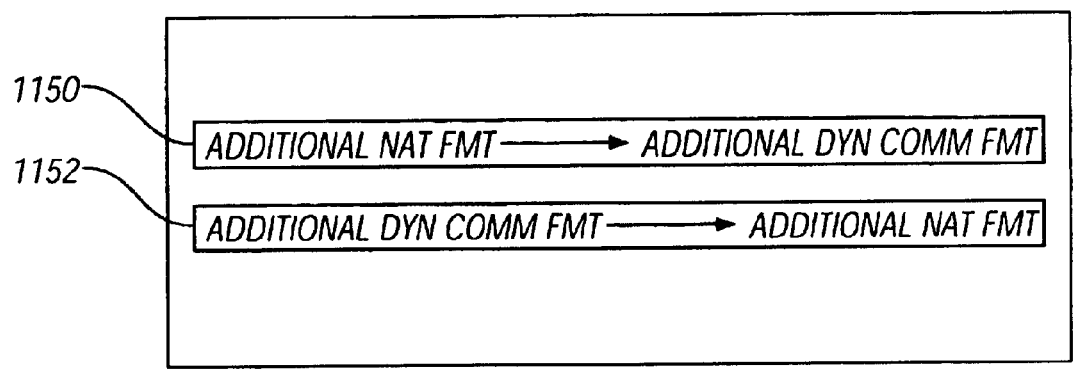
FIG. 11a is a more detailed illustration with respect to embodiments of mappings.

The embodiment illustrated in FIG. 11 includes creating (1114) mappings (120) specifying transformations of records. The mappings (120), as shown in more detail in FIG. 11a, include a mapping (1150) from the additional native format to an additional dynamic common format and a mapping (1152) from the additional dynamic common format to the additional native format.

In embodiments of the kind shown in FIG. 11, the data integration application typically is coupled (1123) for data communications to a multiplicity of native repositories (1118) through a multiplicity of adapters (1116), and the multiplicity of adapters (1116) typically includes the additional adapter (1104). In such embodiments, all the adapters among the multiplicity of adapters typically are loosely coupled (1122, 1120) for data integration to the data integration application.

In embodiments of the kind shown in FIG. 11, the data integration application (116) typically comprises a transformation service (206) capable of transforming formats (1112) in dependence upon the mappings (120), and the transformation service typically is coupled (1121) for data communications to all the adapters among the multiplicity of adapters. In such embodiments, dynamic common formats (119) are subsets of a dynamic common model (118), and the dynamic common model has the capability of specifying transformations to and from dynamic common formats for all formats of records in all datatypes of the multiplicity of native repositories.

Figure 11B:
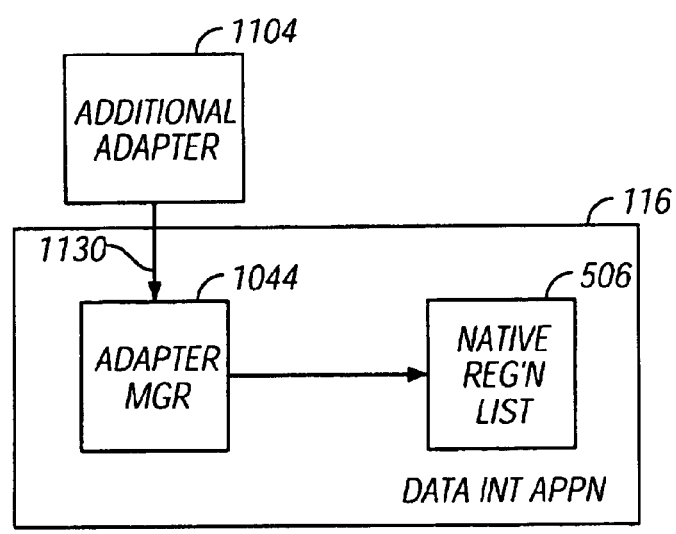
FIG. 11b illustrates embodiments utilizing an adapter manager.
Figure 11C:
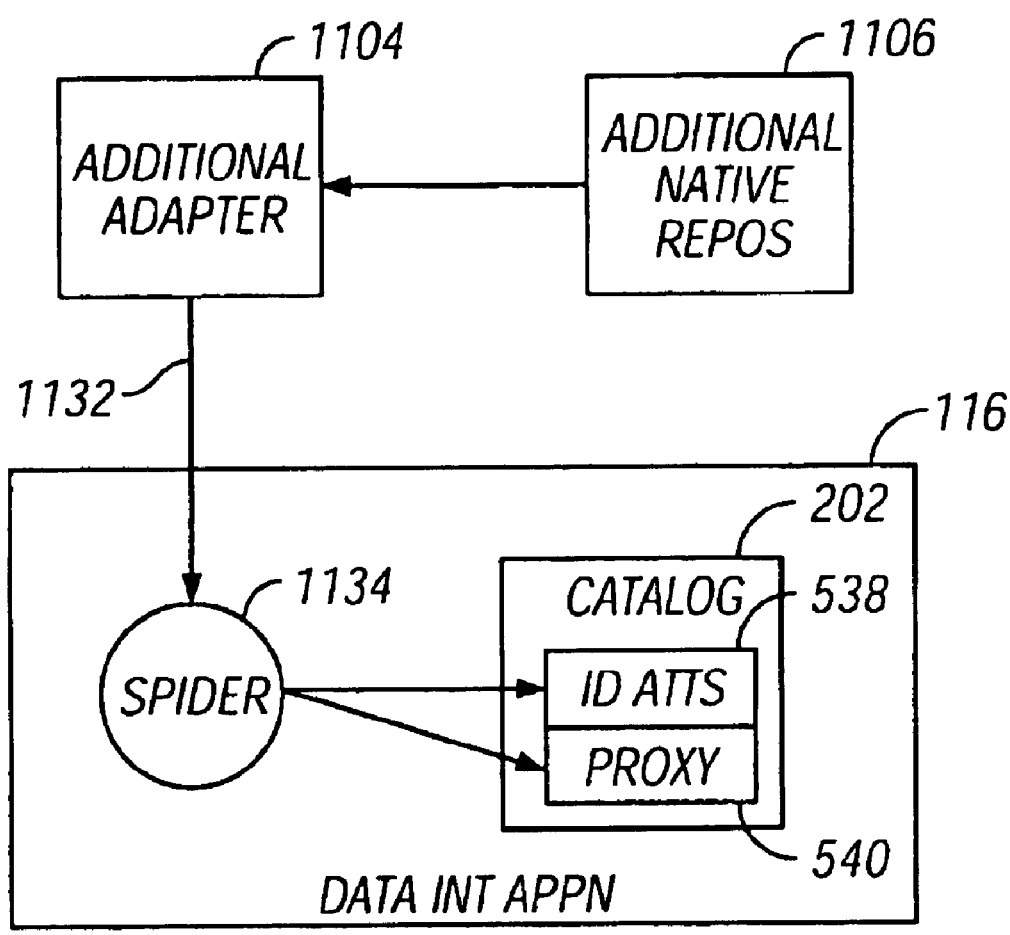
FIG. 11c illustrates embodiments spidering native repositories pursuant to integrating additional native repositories into systems implementing dynamic common models.

A more detailed embodiment illustrated in FIG. 11b includes registering (1130), through an adapter manager (1044) in the data integration application (116), the additional adapter (1104). A still further embodiment, shown in FIG. 11c, includes populating (1132), through a spider (1134), a catalog (202) in the data integration application (116) with identifying attributes (538) and proxy data (540) for all records of all datatypes in the additional native repository (1106).

FIG. 12a illustrates an example embodiment of a native record format for a well. The illustrated native record describes a well in detail, including the identity of the well (1202) as a native well identification code, a standard universal well identifier known as a "UWI" code, well type, common name, operator identification, and a well number. The example native record shown in FIG. 12a includes also the physical location of the well (1204), its latitude and longitude, elevation, total depth, and plug depth. The example native record includes the geopolitical location of the well (1206), its field, basin, county, state, and country. The example native record is includes the class and status history of the well (1208). The example native record as continued for illustration in FIG. 12b includes a representation whether the well is on or off shore (1210). The example native record of FIG. 12b includes information regarding the drilling of the well (1212) including plot, survey, lease identification, drilling permit, completion date, borehole type, and cost.

FIG. 13 illustrates an example embodiment of a native XML for a well. The example embodiment of FIG. 13 illustrates the dynamic common model by comparison with the set of native fields shown in FIGS. 12a and 12b. More specifically, the set of fields shown in FIG. 13 is smaller than that of FIGS. 12a and 12b, because a human operator or programmer has chosen to present as a dynamic common model fewer fields than are actually present in the pertinent native repository, assuming that the examples of FIGS. 12a, 12b, and 13 are all related to the same native repository. It is useful to note the simplicity of adding fields to the dynamic common model. In this case, suppose it were desired to add the native field on_off_shore (ref. 1210 on FIG. 12b). Then a programmer would simply add one or more lines of code as part of the extract function in the adapter for the native repository to write into the XML file of FIG. 13 the line <on_off_shore>ON<on_off_shore> or

<on_off_shore>OFF<on_off_shore> according to whether the well is located on shore or off shore. The mapping would need to be checked in the data integration application to be sure that it would correctly address the new field. In some embodiments, no change in the mapping would be needed. In mappings implemented as XML stylesheets, for example, default instructions are available for fields having similar names, so that "on_off_shore" in some embodiments would already be covered for transformation by a default provision. In an embodiment not having a default that already covered the new field, the mapping is amended to cover the new field. That is, in such embodiments, mappings to and from a dynamic common format are amended to cover the new field. Either way, the process of adding the new field is simple in typical embodiments.

FIG. 14a illustrates an example embodiment of a native record format for a well log curve. FIG. 14b continues the illustration of an example embodiment of a native record format for a well log curve. FIGS. 14a and 14b together illustrate one way in which one native repository formats records having one datatype, survey curves for wells. Native record formats naturally vary widely across various native databases and repositories. FIG. 15 illustrates an example embodiment of a native mapping format in the form of native XML for a well log curve.

FIG. 16 illustrates an example embodiment of a dynamic common format implemented in XML, in this case, a dynamic common format in XML for a well log curve record. FIGS. 17a–17i illustrate an example mapping implemented in the form of an XML stylesheet, described more specifically below.

More specifically, FIG. 17a illustrates an embodiment of an XML stylesheet header, in the illustrated example embodiment directed to mapping dynamic common format to catalog XML, and FIG. 17b illustrates an example embodiment of mapping through an XML stylesheet from dynamic common format to catalog XML for a record of well datatype. FIG. 17c continues the illustration of an example embodiment of mapping through an XML stylesheet from dynamic common format to catalog XML for a record of well datatype, and FIG. 17d illustrates an example embodiment of mapping through an XML stylesheet from dynamic common format to catalog XML for a record of well log datatype.

FIG. 17e illustrates an example embodiment of mapping through an XML stylesheet from dynamic common format to catalog XML for a record of well log curve datatype, and FIG. 17f illustrates an example embodiment of mapping through an XML stylesheet from dynamic common format to catalog XML for a record of formation tops datatype. FIG. 17g illustrates an example embodiment of mapping through an XML stylesheet from dynamic common format to catalog XML for a record of well deviation survey datatype, while FIG. 17h illustrates an example embodiment of mapping through an XML stylesheet from dynamic common format to catalog XML for a record of well core datatype. FIG. 17i illustrates an example embodiment of mapping through an XML stylesheet from dynamic common format to catalog XML for data elements having similar tag names in records of several datatypes.

FIG. 18 illustrates an embodiment of a catalog record. It is useful to compare the number of data elements in the example catalog record to the number of data elements in the example native well record shown in FIGS. 12a and 12b. The example catalog record of FIG. 18, which itself also apparently represents a well, contains substantially fewer data elements that the native record shown in FIGS. 12a and 12b. Catalog records typically contains fewer data elements because the data elements included in the catalog are only the data elements useful for display to users in aid of selecting data for transfers for data integration. In the particular example of FIG. 18, such data elements include fields identifying the well (1804), fields representing the physical (1808) and geopolitical (1910) locations of the well, and fields indicating the well's status, type, and depth (1806). In contrast, the native data elements shown in FIGS. 12a and 12b include all operational data relevant to well maintenance, operations, or analysis.

Turning now to FIG. 19, an additional detailed embodiment is seen as a base class diagram (1902) for an adapter. As shown in FIG. 19, a typical embodiment of an adapter includes member methods for extracting (1904) data from a native repository, inserting (1906) data into a native repository, spidering (1908) data from a native repository in support of catalog entries, registering (1912) a native repository with a data integration application, optionally checking (1910) upon request current validity of catalog entries in support of catalog integrity, handling (1914) remote procedure calls and data communications, transforming (1916) native mapping format to dynamic common format, and constructing (1918) adapter class objects.

It is useful to note that the kind of spider( ) member method (1908) in an adapter, as shown in FIG. 19, is not a "spider" as that term has been used to describe processes or programs within a data integration application for maintaining catalogs. A spider( ) member method in an adapter is called by, or passed messages from, a spider program or process in a data integration application in the process of updating a catalog. A spider( ) member method in an adapter is called a "spider( )," at some slight risk of confusion, to commemorate that it is a method within an adapter that supports the overall procedure of spidering for a catalog in a data integration application. This specification, for clarity, attempts to consistently refer to spider( ) member methods in adapters as "spider( ) member methods in adapters."

Because adapters typically function in environments of intense data communications, their message handling functions are important. Typical adapter class objects provide a message handling method such as the one mentioned at reference (1914) in FIG. 19. A typical message handling method, for example, accepts two parameters, 'Message' and 'Data' of type string. These parameters in many embodiments are XML formatted strings. Typical embodiments implement a method return also as an XML string. That is, a typical example of a declaration for a message handling method is:

string handleMessage(string Message, string Data)

The 'Message' parameter typically is used to identify one of the typical functions of adapters, such as the functions represented by the other member methods shown in FIG. 19. The 'Data' parameter typically in such embodiments provides the data or parameters to be used by the function identified in the 'Message' parameter.

From this description of the structure of typical example adapters, it can be seen that the process of developing an adapter typically is to have an adapter inherit from an adapter base class. In many embodiments, then, the adapter class object subject to such inheritance is completed by writing code implementing the individual adapter functions or member methods so that they accept data from a 'Data' parameter in a 'handleMessage( )' method and perform the functions identified in a 'Message' parameter. It is at this point that it is generally necessary to write code for adapter functions or member methods that is either written in the language of a database management system for a native repository or that calls application programming interfaces ("APIs") supported by a native repository or its database management system. For adapters for native repositories not implemented as 'databases' as such under database management systems, it is typically necessary in developing adapter functions or member methods to write code that writes or reads directly to or from files systems at the level of a computer operating system.

More specifically, message handling functions or member methods within example embodiments functions according to the following pseudocode.

```
string handleMessage(String Command, String Data)
{
    parse Command parameter string to obtain the command;
    if (command is "Extract")
    {
        parse Data parameter string for proxy data;
        for each proxy
        {
            read from native repository;
            transform to common format;
            add to return_string;
        }
        return(return_string);
    }
    if(message is "Insert")
    {
        parse Data string for data to be inserted;
        transform from common to native;
        insert into native repository;
        create proxy data for new inserts;
        concatenate proxy data into return_string;
        transform proxy data in return_string into common
            format;
        return(return_string);
    }
    if(message is "Spider")
    {
        parse Data string for last spider date;
        read records meeting last spider date from native
            repository;
        concatenate the read records into return_string;
        transform from native to common format;
        return(return_string)
    }
} // end of Example Message Handler Pseudocode.
```

Alternative message handling functions or member methods within other example embodiments functions according to the following pseudocode.

```
string handleMessage(String Command, String Data)
{
    parse Command parameter string to obtain the command;
    if (command is "Extract")
    {
        parse Data parameter string for proxy data;
        for each item of proxy data
        {
            concatenate(return_string, extract(proxy_
                data));
            // the extract() routine in this example includes
                transformation
            // to common, typically through a call to a
                function such as
            // transform() shown at reference (1916) on
                Figure 19
        }
        return(return_string);
    }
    if(message is "Insert")
    {
        parse Data string for data to be inserted;
        transform from common to native;
        insert(data_to_be_inserted);
        create proxy data for new inserts;
        concatenate(return_string, proxy_data);
        transform(return_string); // to dynamic common
            format
        return(return_string);
    }
    if(message is "Spider")
    {
        parse Data string for last spider date;
        read records meeting last spider date from native
            repository;
        concatenate(return_string, read_records);
        transform(return_string); // from native to dynamic
            common format
        return(return_string)
    }
} // end of Example Message Handler Pseudocode.
```

As noted above in this specification, many embodiments utilize XML for mapping and for data communications. The following pseudocode is an example of an "extract" call implemented through as XML string sent to a message handler in an adapter called "NativeAdapter1." In the example, both a "Message" parameter identifying the "extract" function and a Data parameter are implemented in the same XML string:

```
<message>
    <recipient>NativeAdapter1<recipient/>
    <category/><subcategory>extract<subcategory/>
    <parameter>
        <para><type/>
            <name>datatype</name>
            <value>well</value>
            <operator/>
        </para>
        <para><type/>
            <name>NativeDTID</name>
            <value>502</value>
            <operator/>
        </para>
        <para><type/>
            <name>project</name>
            <value>lowcock</value>
            <operator/>
        </para>
        <para><type/>
            <name>interpreter</name>
            <value>Bill Liang</value>
            <operator/>
        </para>
    </parameter>
<message>
```

A further exemplary use case illustrates some of the benefits of data integration with a dynamic common model. Consider a user of a first native repository having a first adapter interfacing the first native repository to a data integration application having a dynamic common model integrating many native repositories. Consider a case in which the user determines that the first native repository is not fully integrated through the dynamic common model with a second native repository in that data transfers seem incomplete. That is, results of transfers from the second native repository to the first native repository exclude a data element that the user wishes to include in the first native repository. Such an exclusion occurs, for example, when a user redefines an implementation of a datatype in the second repository but has not yet updated the pertinent mappings to and from dynamic common, or the mappings are updated erroneously. All that is required to repair this exclusion are two simple steps: (1) if the adapter for the second native repository does not presently extract and translate the excluded data element, or does so incorrectly, then the adapter for the second native repository needs to be amended to include correct extraction and translation of the excluded data element into the second native mapping format of the second native repository, and (2) the mapping from the second native mapping format to dynamic common format is checked, and, if necessary, amended correctly to include the excluded data element.

The two-step procedure just outlined illustrates some of the benefits of the dynamic common model. In a data integration that includes many native repositories and many adapters, only two elements need to be checked or amended to correct the exemplary typical variation from full integration. To the extent that the mapping needs to be amended, no programming is required, only text editing. To the extent that an adapter needs to be amended, only a small amount of programming is involved, just enough in the current example to add the one excluded data element. In this manner, a change that was nearly impossible to accomplish under the standard model of prior art is made almost trivial. In this manner is illustrated what is meant by the quality of full union in the dynamic common model, that, despite the fact that human error or human choice may as a practical matter exclude data elements in a way that fails the definition of full union, nevertheless, there is within embodiments of the model itself means and methods to quickly and simply include any omitted data element of any datatype so that union of data elements among native repositories is readily capable of achievement to any practical extent desired.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method of creating a system implementing a dynamic common model, the system including a data integration application, the method comprising the steps of:

developing a first adapter for a first native repository, the first adapter being loosely coupled for data integration to the data integration application, the first native repository comprising first native records having first native formats, the first native formats belonging to categories of formats identified as datatypes;

developing a second adapter for a second native repository, the second adapter being loosely coupled for data integration to the data integration application, the second native repository comprising second native records having second native formats, the second native formats belonging to categories of formats identified as datatypes;

creating mappings specifying transformations of records: from the first native format to a first dynamic common format, from the first dynamic common format to the first native format, from the second native format to a second dynamic common format, and from the second dynamic common format to the second native format;

providing a transformation service capable of transforming formats in dependence upon the mappings, the transformation service coupled for data communications to the first adapter and to the second adapter;

wherein the data integration application is coupled for data communications to a multiplicity of native repositories through a multiplicity of adapters;

wherein the multiplicity of adapters includes the first adapter and the second adapter;

wherein all the adapters among the multiplicity of adapters are loosely coupled for data integration to the data integration application;

wherein the data integration application comprises the transformation service; and wherein the dynamic common format is a subset of a dynamic common model, the dynamic common model having the capability of specifying transformations to and from dynamic common format for all formats of records in all datatypes of the multiplicity of native repositories.

2. The method of claim 1 wherein the multiplicity of native repositories consists of only the first native repository and the second native repository.

3. The method of claim 1 further comprising registering, through an adapter manager in the data integration application, the adapters for the first native repository and the second native repository.

4. The method of claim 1 further comprising populating, through spiders, a catalog in the data integration application with identifying attributes and proxy data for all records of all datatypes in the native first native repository and the second native repository.

5. A method of integrating an additional native repository with a system implementing a dynamic common model, the system including a data integration application, the method comprising the steps of:

developing a first adapter;

creating mappings specifying transformations of records;

from a first native format to a first dynamic common format, and from the first dynamic common format to the first native format;

developing an additional adapter for the additional native repository, the additional adapter being loosely coupled for data integration to the data integration application, the additional native repository comprising additional native records having at least one additional native format, the additional native format belonging to at least one category of formats identified as a datatype;

creating mappings specifying transformations of records: from the at least one additional native format to an additional dynamic common format, and from the additional dynamic common format to the at least one additional native format;

wherein the data integration application is coupled for data communications to a multiplicity of native repositories through a multiplicity of adapters;

wherein the multiplicity of adapters includes the additional adapter;

wherein all the adapters among the multiplicity of adapters are loosely coupled for data integration to the data integration application;

wherein the data integration application comprises a transformation service capable of transforming formats in dependence upon the mappings, the transformation service coupled for data communications to all the adapters among the multiplicity of adapters;

wherein the dynamic common format is a subset of a dynamic common model, the dynamic common model having the capability of specifying transformations to and from dynamic common format for all formats of records in all datatypes of the multiplicity of native repositories.

6. The method of claim 5 further comprising registering, through an adapter manager in the data integration application, the additional adapter.

7. The method of claim 5 further comprising populating, through a spider, a catalog in the data integration application with identifying attributes and proxy data for all records of all datatypes in the additional native repository.

* * * * *

UNITED STATES PATENT AND TRADEMARK OFFICE
CERTIFICATE OF CORRECTION

PATENT NO. : 6,792,431 B2 Page 1 of 1
APPLICATION NO. : 09/850317
DATED : September 14, 2004
INVENTOR(S) : Summers el al.

It is certified that error appears in the above-identified patent and that said Letters Patent is hereby corrected as shown below:

On the title page: Item Assignee: "Anadarko Petroleum Corporation" should read -- Petris Technology Corporation --.

Signed and Sealed this

Third Day of October, 2006

JON W. DUDAS
*Director of the United States Patent and Trademark Office*